US012712698B2

(12) United States Patent
Hu et al.

(10) Patent No.: US 12,712,698 B2
(45) Date of Patent: Aug. 18, 2026

(54) DISTRIBUTED-TONE RESOURCE UNIT (dRU) PLAN IN WIRELESS COMMUNICATIONS

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 391 days.

(21) Appl. No.: 18/373,269

(22) Filed: Sep. 26, 2023

(65) Prior Publication Data

US 2024/0113842 A1 Apr. 4, 2024

Related U.S. Application Data

(60) Provisional application No. 63/507,485, filed on Jun. 12, 2023, provisional application No. 63/507,132, filed on Jun. 9, 2023, provisional application No. 63/377,556, filed on Sep. 29, 2022.

(51) Int. Cl.
*H04W 4/00* (2018.01)
*H04L 5/00* (2006.01)

(52) U.S. Cl.
CPC .......... *H04L 5/0064* (2013.01); *H04L 5/0073* (2013.01)

(58) Field of Classification Search
CPC ... H04L 5/0064; H04L 5/0073; H04L 5/0041; H04W 72/02; H04W 84/12; H04W 72/0453
See application file for complete search history.

(56) References Cited

U.S. PATENT DOCUMENTS

| | | | | |
|---|---|---|---|---|
| 12,267,821 B2 * | 4/2025 | Kim | .................. | H04W 72/0453 |
| 2016/0165482 A1 * | 6/2016 | Yang | ................. | H04L 27/26132 370/336 |
| 2017/0034829 A1 * | 2/2017 | Yang | ..................... | H04L 5/0048 |
| 2017/0273083 A1 * | 9/2017 | Chen | ........................ | H04L 5/001 |
| 2019/0109684 A1 * | 4/2019 | Chen | ........................ | H04L 5/003 |
| 2019/0253296 A1 * | 8/2019 | Chen | ................. | H04L 27/26025 |
| 2021/0281454 A1 * | 9/2021 | Yang | ..................... | H04L 5/0094 |
| 2021/0360628 A1 * | 11/2021 | Kim | ....................... | H04L 5/0037 |
| 2021/0409249 A1 * | 12/2021 | Chen | ..................... | H04L 1/0026 |

(Continued)

FOREIGN PATENT DOCUMENTS

| | | | | |
|---|---|---|---|---|
| EP | 4064604 A1 | 9/2022 | | |
| TW | 202310583 A * | 3/2023 | ........... | H04L 5/0051 |
| WO | WO-2023059403 A1 * | 4/2023 | ........... | H04L 5/0069 |

OTHER PUBLICATIONS

European Patent Office, Extended European Search Report in European Patent Application No. 23200039.8-1213, Mar. 1, 2024.

*Primary Examiner* — Thai Dinh Hoang
(74) *Attorney, Agent, or Firm* — Andy M. Han; Han IP PLLC

(57) ABSTRACT

Techniques pertaining to 80 MHz distributed-tone resource unit (dRU) tone plan-based dRU designs for wide distribution bandwidths 160 MHz and 320 MHz in wireless communications are described. An apparatus (e.g., station (STA)) generates a distributed-tone resource unit (dRU) using a 80 MHz dRU tone plan as a basic building block. The apparatus then performs a wireless communication in a 160 MHz or 320 MHz distribution bandwidth with the dRU.

10 Claims, 36 Drawing Sheets

700

(56) References Cited

U.S. PATENT DOCUMENTS

| | | | | |
|---|---|---|---|---|
| 2022/0311565 | A1* | 9/2022 | Hu | H04L 5/0032 |
| 2022/0416988 | A1* | 12/2022 | Cao | H04B 1/69 |
| 2023/0048884 | A1* | 2/2023 | Yang | H04L 5/0041 |
| 2024/0297811 | A1* | 9/2024 | Chen | H04L 25/0226 |

* cited by examiner

200

| RU Size | BW20 | | BW40 | | BW80 | | BW160 | | BW320 | |
|---|---|---|---|---|---|---|---|---|---|---|
| | #Tone/MHz | Power Boost (dB) | #Tone/MHz | Power Boost (dB) | #Tone/MHz | Power Boost (dB) | #Tone/MHz | Power Boost (dB) | #Tone/MHz | Power Boost (dB) |
| RU26 | 2 | 8.13 | 1 | 11.14 | 1 | 11.14 | 1 | 11.14 | 1 | 11.14 |
| RU52 | 3 | 6.37 | 2 | 8.13 | 1 | 11.14 | 1 | 11.14 | 1 | 11.14 |
| MRU78 (26+52) | 5 | 4.15 | 3 | 6.37 | 2 | 8.13 | 1 | 11.14 | 1 | 11.14 |
| RU106 | 6 | 3.56 | 3 | 6.37 | 2 | 8.13 | 1 | 11.14 | 1 | 11.14 |
| MRU132 (26+106) | 8 | 2.11 | 4 | 5.12 | 2 | 8.13 | 1 | 11.14 | 1 | 11.14 |
| RU242 | N/A | N/A | 7 | 2.69 | 4 | 5.12 | 2 | 8.13 | 1 | 11.14 |
| RU484 | N/A | N/A | N/A | N/A | 7 | 2.69 | 4 | 5.12 | 2 | 8.13 |
| MRU(242+484) | N/A | N/A | N/A | N/A | 10 | 1.14 | 5 | 4.15 | 3 | 6.37 |
| RU996 | N/A | N/A | N/A | N/A | N/A | N/A | 7 | 2.69 | 4 | 5.12 |
| MRU(484+996) | N/A | N/A | N/A | N/A | N/A | N/A | 10 | 1.14 | 5 | 4.15 |
| RU2x996 | N/A | N/A | N/A | N/A | N/A | N/A | N/A | N/A | 7 | 2.69 |

| RU Size | BW20 | | BW40 | | BW80 | | BW160 | | BW320 | |
|---|---|---|---|---|---|---|---|---|---|---|
| | #Tone/MHz | Power Boost (dB) | #Tone/MHz | Power Boost (dB) | #Tone/MHz | Power Boost (dB) | #Tone/MHz | Power Boost (dB) | #Tone/MHz | Power Boost (dB) |
| RU26 | 2 | 8.13 | 1 | 11.14 | 1 | 11.14 | 1 | 11.14 | 1 | 11.14 |
| RU52 | 3 | 6.37 | 2 | 8.13 | 1 | 11.14 | 1 | 11.14 | 1 | 11.14 |
| RU106 | 6 | 3.56 | 3 | 6.37 | 2 | 8.13 | 1 | 11.14 | 1 | 11.14 |
| RU242 | N/A | N/A | 7 | 2.69 | 4 | 5.12 | 2 | 8.13 | 1 | 11.14 |
| RU484 | N/A | N/A | N/A | N/A | 7 | 2.69 | 4 | 5.12 | 2 | 8.13 |
| RU996 | N/A | N/A | N/A | N/A | N/A | N/A | 7 | 2.69 | 4 | 5.12 |
| RU2x996 | N/A | N/A | N/A | N/A | N/A | N/A | N/A | N/A | 7 | 2.69 |

dRU supported on 20/40/80MHz bandwidth dRU proposed to be supported on 160MHz/320MHz bandwidth

STA Tx Power (dBm) of rRU, -1dBm/MHz

| RU Size | #Tone | Occupied BW (MHz) | TxPwr(dBm) |
|---|---|---|---|
| RU26 | 26 | 2.03 | 2.08 |
| RU52 | 52 | 4.06 | 5.09 |
| MRU78 (26+52) | 78 | 6.09 | 6.85 |
| RU106 | 106 | 8.28 | 8.18 |
| MRU132 (26+106) | 132 | 10.31 | 9.13 |
| RU242 | 242 | 18.91 | 11.77 |
| RU484 | 484 | 37.81 | 14.78 |
| MRU(242+484) | 726 | 56.72 | 16.54 |
| RU996 | 996 | 77.81 | 17.91 |
| RU2x996 | 1992 | 155.63 | 20.92 |

| RU Size | dRU Tx Power (dBm) | | | | |
|---|---|---|---|---|---|
| | BW20 | BW40 | BW80 | BW160 | BW320 |
| RU26 | 10.21 | 13.22 | 13.22 | 13.22 | 13.22 |
| RU52 | 11.46 | 13.22 | 16.23 | 16.23 | 16.23 |
| RU106 | 11.74 | 14.55 | 16.31 | 19.32 | 19.32 |
| RU242 | N/A | 14.46 | 16.89 | 19.90 | 22.91 |
| RU484 | N/A | N/A | 17.47 | 19.90 | 22.91 |
| RU996 | N/A | N/A | N/A | 20.60 | 23.03 |
| RU2x996 | N/A | N/A | N/A | N/A | 23.61 |

All < 24dBm

| | | | | |
|---|---|---|---|---|
| 106-tone dRU<br>i=1:16 | dRU1<br>[-1011:72:-579,-475:72:-43,69:72:429,533:72:965]<br>[-995:72:-563,-459:72:-99,13:72:445,549:72:981]<br>[-971:72:-539,-435:72:-75,29:72:461,565:72:925]<br>[-955:72:-595,-491:72:-59,53:72:485,589:72:949] | dRU2<br>[-1003:72:-571,-467:72:-35,77:72:437,541:72:973]<br>[-987:72:-555,-451:72:-91,21:72:453,557:72:989]<br>[-963:72:-531,-427:72:-67,37:72:469,573:72:933]<br>[-947:72:-587,-483:72:-51,61:72:493,597:72:957] | dRU3<br>[-1007:72:-575,-471:72:-39,73:72:433,537:72:969]<br>[-991:72:-559,-455:72:-95,17:72:449,553:72:985]<br>[-967:72:-535,-431:72:-71,33:72:465,569:72:929]<br>[-951:72:-591,-487:72:-55,57:72:489,593:72:953] | dRU4<br>[-999:72:-567,-463:72:-31,81:72:441,545:72:977]<br>[-983:72:-551,-447:72:-87,25:72:457,561:72:993]<br>[-959:72:-599,-495:72:-63,41:72:473,577:72:937]<br>[-943:72:-583,-479:72:-47,65:72:425,529:72:961] |
| | dRU5<br>[-1009:72:-577,-473:72:-41,71:72:431,535:72:967]<br>[-993:72:-561,-457:72:-97,15:72:447,551:72:983]<br>[-969:72:-537,-433:72:-73,31:72:463,567:72:927]<br>[-953:72:-593,-489:72:-57,55:72:487,591:72:951] | dRU6<br>[-1001:72:-569,-465:72:-33,79:72:439,543:72:975]<br>[-985:72:-553,-449:72:-89,23:72:455,559:72:991]<br>[-961:72:-529,-425:72:-65,39:72:471,575:72:935]<br>[-945:72:-585,-481:72:-49,63:72:495,599:72:959] | dRU7<br>[-1005:72:-573,-469:72:-37,75:72:435,539:72:971]<br>[-989:72:-557,-453:72:-93,19:72:451,555:72:987]<br>[-965:72:-533,-429:72:-69,35:72:467,571:72:931]<br>[-949:72:-589,-485:72:-53,59:72:491,595:72:955] | dRU8<br>[-997:72:-565,-461:72:-29,83:72:443,547:72:979]<br>[-981:72:-549,-445:72:-85,27:72:459,563:72:995]<br>[-957:72:-597,-493:72:-61,43:72:475,579:72:939]<br>[-941:72:-581,-477:72:-45,67:72:427,531:72:963] |
| | dRU9<br>[-1010:72:-578,-474:72:-42,70:72:430,534:72:966]<br>[-994:72:-562,-458:72:-98,14:72:446,550:72:982]<br>[-970:72:-538,-434:72:-74,30:72:462,566:72:926]<br>[-954:72:-594,-490:72:-58,54:72:486,590:72:950] | dRU10<br>[-1002:72:-570,-466:72:-34,78:72:438,542:72:974]<br>[-986:72:-554,-450:72:-90,22:72:454,558:72:990]<br>[-962:72:-530,-426:72:-66,38:72:470,574:72:934]<br>[-946:72:-586,-482:72:-50,62:72:494,598:72:958] | dRU11<br>[-1006:72:-574,-470:72:-38,74:72:434,538:72:970]<br>[-990:72:-558,-454:72:-94,18:72:450,554:72:986]<br>[-966:72:-534,-430:72:-70,34:72:466,570:72:930]<br>[-950:72:-590,-486:72:-54,58:72:490,594:72:954] | dRU12<br>[-998:72:-566,-462:72:-30,82:72:442,546:72:978]<br>[-982:72:-550,-446:72:-86,26:72:458,562:72:994]<br>[-958:72:-598,-494:72:-62,42:72:474,578:72:938]<br>[-942:72:-582,-478:72:-46,66:72:426,530:72:962] |
| | dRU13<br>[-1008:72:-576,-472:72:-40,72:72:432,536:72:968]<br>[-992:72:-560,-456:72:-96,16:72:448,552:72:984]<br>[-968:72:-536,-432:72:-72,32:72:464,568:72:928]<br>[-952:72:-592,-488:72:-56,56:72:488,592:72:952] | dRU14<br>[-1000:72:-568,-464:72:-32,80:72:440,544:72:976]<br>[-984:72:-552,-448:72:-88,24:72:456,560:72:992]<br>[-960:72:-528,-424:72:-64,40:72:472,576:72:936]<br>[-944:72:-584,-480:72:-48,64:72:496,600:72:960] | dRU15<br>[-1004:72:-572,-468:72:-36,76:72:436,540:72:972]<br>[-988:72:-556,-452:72:-92,20:72:452,556:72:988]<br>[-964:72:-532,-428:72:-68,36:72:468,572:72:932]<br>[-948:72:-588,-484:72:-52,60:72:492,596:72:956] | dRU16<br>[-996:72:-564,-460:72:-28,84:72:444,548:72:980]<br>[-980:72:-548,-444:72:-84,28:72:460,564:72:996]<br>[-956:72:-596,-492:72:-60,44:72:476,580:72:940]<br>[-940:72:-580,-476:72:-44,68:72:428,532:72:964] |
| 242-tone dRU<br>i=1:8 | dRU1<br>[-1011:8:-531,-491:8:-19,13:8:493,533:8:1005] | dRU2<br>[-1007:8:-535,-495:8:-15,17:8:489,529:8:1009] | dRU3<br>[-1009:8:-529,-489:8:-17,15:8:495,535:8:1007] | dRU4<br>[-1005:8:-533,-493:8:-13,19:8:491,531:8:1011] |
| | dRU5<br>[-1010:8:-530,-490:8:-18,14:8:494,534:8:1006] | dRU6<br>[-1006:8:-534,-494:8:-14,18:8:490,530:8:1010] | dRU7<br>[-1008:8:-528,-488:8:-16,16:8:496,536:8:1008] | dRU8<br>[-1004:8:-532,-492:8:-12,20:8:492,532:8:1012] |
| 484-tone dRU<br>i=1:4 | dRU1<br>[-1011:4:-531,-495:4:-15,13:4:493,529:4:1009] | | dRU2<br>[-1009:4:-529,-493:4:-13,15:4:495,531:4:1011] | |
| | dRU3<br>[-1010:4:-530,-494:4:-14,14:4:494,530:4:1010] | | dRU4<br>[-1008:4:-528,-492:4:-12,16:4:496,532:4:1012] | |
| 996-tone dRU<br>i=1:2 | dRU1<br>[-1011:2:-515,-509:2:-13,13:2:509,515:2:1011] | | dRU2<br>[-1012:2:-516,-508:2:-12,12:2:508,516:2:1012] | |

| | | | | |
|---|---|---|---|---|
| 484-tone dRU<br>i=1:8 | dRU1<br>[-2035:8:-1555,-1515:8:-1043,-1011:8:-531,-491:8:-19]<br>[13:8:493,533:8:1005,1037:8:1517,1557:8:2029] | dRU2<br>[-2031:8:-1559,-1519:8:-1039,-1007:8:-535,-495:8:-15]<br>[17:8:489,529:8:1009,1041:8:1513,1553:8:2033] | dRU3<br>[-2033:8:-1553,-1513:8:-1041,-1009:8:-529,-489:8:-17]<br>[15:8:495,535:8:1007,1039:8:1519,1559:8:2031] | dRU4<br>[-2029:8:-1557,-1517:8:-1037,-1005:8:-533,-493:8:-13]<br>[19:8:491,531:8:1011,1043:8:1515,1555:8:2035] |
| | dRU5<br>[-2034:8:-1554,-1514:8:-1042,-1010:8:-530,-490:8:-18]<br>[14:8:494,534:8:1006,1038:8:1518,1558:8:2030] | dRU6<br>[-2030:8:-1558,-1518:8:-1038,-1006:8:-534,-494:8:-14]<br>[18:8:490,530:8:1010,1042:8:1514,1554:8:2034] | dRU7<br>[-2032:8:-1552,-1512:8:-1040,-1008:8:-528,-488:8:-16]<br>[16:8:496,536:8:1008,1040:8:1520,1560:8:2032] | dRU8<br>[-2028:8:-1556,-1516:8:-1036,-1004:8:-532,-492:8:-12]<br>[20:8:492,532:8:1012,1044:8:1516,1556:8:2036] |
| 996-tone dRU<br>i=1:4 | dRU1<br>[-2035:4:-1539,-1531:4:-1039,-1011:4:-515,-507:4:-15]<br>[13:4:509,517:4:1009,1037:4:1533,1541:4:2033] | | dRU2<br>[-2033:4:-1541,-1533:4:-1037,-1009:4:-517,-509:4:-13]<br>[15:4:507,515:4:1011,1039:4:1531,1539:4:2035] | |
| | dRU3<br>[-2034:4:-1542,-1530:4:-1034,-1010:4:-518,-506:4:-10]<br>[10:4:506,518:4:1014,1038:4:1530,1542:4:2034] | | dRU4<br>[-2032:4:-1540,-1532:4:-1036,-1008:4:-516,-508:4:-12]<br>[12:4:508,516:4:1012,1040:4:1532,1544:4:2036] | |
| 2x996-tone dRU<br>i=1:2 | dRU1<br>[-2035:2:-1539,-1533:2:-1037,-1011:2:-515,-509:2:-13]<br>[13:2:509,515:2:1011,1037:2:1533,1539:2:2035] | | dRU2<br>[-2034:2:-1540,-1532:2:-1034,-1010:2:-516,-508:2:-10]<br>[10:2:508,516:2:1014,1038:2:1532,1542:2:2036] | |

| | | | | |
|---|---|---|---|---|
| dRU106<br>i=1:16 | dRU1<br>[dRU52_1(A),dRU52_3(B)]-512,-1011;<br>[dRU52_1(A),dRU52_3(B)]+512,13; | dRU2<br>[dRU52_2(A),dRU52_4(B)]-512,-1003;<br>[dRU52_2(A),dRU52_4(B)]+512,21; | dRU3<br>[dRU52_1(B),dRU52_3(A)]-512,-1007;<br>[dRU52_1(B),dRU52_3(A)]+512,17; | dRU4<br>[dRU52_2(B),dRU52_4(A)]-512,-999;<br>[dRU52_2(B),dRU52_4(A)]+512,25; |
| | dRU5<br>[dRU52_5(B),dRU52_7(A)]-512,-1009;<br>[dRU52_5(B),dRU52_7(A)]+512,15; | dRU6<br>[dRU52_6(B),dRU52_8(A)]-512,-1001;<br>[dRU52_6(B),dRU52_8(A)]+512,23; | dRU7<br>[dRU52_5(A),dRU52_7(B)]-512,-1005;<br>[dRU52_5(A),dRU52_7(B)]+512,19; | dRU8<br>[dRU52_6(A),dRU52_8(B)]-512,-997;<br>[dRU52_6(A),dRU52_8(B)]+512,27; |
| | dRU9<br>[dRU52_9(A),dRU52_11(B)]-512,-1010;<br>[dRU52_9(A),dRU52_11(B)]+512,14; | dRU10<br>[dRU52_10(A),dRU52_12(B)]-512,-1002;<br>[dRU52_10(A),dRU52_12(B)]+512,22; | dRU11<br>[dRU52_9(B),dRU52_11(A)]-512,-1006;<br>[dRU52_9(B),dRU52_11(A)]+512,18; | dRU12<br>[dRU52_10(B),dRU52_12(A)]-512,-998;<br>[dRU52_10(B),dRU52_12(A)]+512,26; |
| | dRU13<br>[dRU52_13(B),dRU52_15(A)]-512,-1008;<br>[dRU52_13(B),dRU52_15(A)]+512,16; | dRU14<br>[dRU52_14(B),dRU52_16(A)]-512,-1000;<br>[dRU52_14(B),dRU52_16(A)]+512,24; | dRU15<br>[dRU52_13(A),dRU52_15(B)]-512,-1004;<br>[dRU52_13(A),dRU52_15(B)]+512,20; | dRU16<br>[dRU52_14(A),dRU52_16(B)]-512,-996;<br>[dRU52_14(A),dRU52_16(B)]+512,28; |
| dRU242<br>i=1:8 | dRU1<br>[dRU106_1(X),dRU106_2(Y)]-512;<br>[dRU106_1(X),dRU106_2(Y)]+512;<br>[dRU26_5(C)-512 dRU26_5(C)+512;<br>[-1011,-19,13,1005] | dRU2<br>[dRU106_1(Y),dRU106_2(X)]-512;<br>[dRU106_1(Y),dRU106_2(X)]+512;<br>[dRU26_5(D)-512 dRU26_5(D)+512;<br>[-999,-15,25,1009] | dRU3<br>[dRU106_3(Y),dRU106_4(X)]-512;<br>[dRU106_3(Y),dRU106_4(X)]+512;<br>[dRU26_14(C)-512 dRU26_14(C)+512;<br>[-1009,-17,15,1007] | dRU4<br>[dRU106_3(X),dRU106_4(Y)]-512;<br>[dRU106_3(X),dRU106_4(Y)]+512;<br>[dRU26_14(D)-512 dRU26_14(D)+512;<br>[-997,-13,27,1011] |
| | dRU5<br>[dRU106_5(X),dRU106_6(Y)]-512;<br>[dRU106_5(X),dRU106_6(Y)]+512;<br>[dRU26_23(C)-512 dRU26_23(C)+512;<br>[-1010,-18,14,1006] | dRU6<br>[dRU106_5(Y),dRU106_6(X)]-512;<br>[dRU106_5(Y),dRU106_6(X)]+512;<br>[dRU26_23(D)-512 dRU26_23(D)+512;<br>[-998,-14,26,1010] | dRU7<br>[dRU106_7(Y),dRU106_8(X)]-512;<br>[dRU106_7(Y),dRU106_8(X)]+512;<br>[dRU26_32(C)-512 dRU26_32(C)+512;<br>[-1008,-16,16,1008] | dRU8<br>[dRU106_7(X),dRU106_8(Y)]-512;<br>[dRU106_7(X),dRU106_8(Y)]+512;<br>[dRU26_32(D)-512 dRU26_32(D)+512;<br>[-996,-12,28,1012] |
| dRU484<br>i=1:4 | dRU1<br>[dRU242_1-512,dRU242_1+512] | dRU2<br>[dRU242_2-512,dRU242_2+512] | dRU3<br>[dRU242_3-512,dRU242_3+512] | dRU4<br>[dRU242_4-512,dRU242_4+512] |
| dRU996<br>i=1:2 | dRU1<br>[dRU484_1-512,dRU484_1+512],[-527:2:-497],[497:2:527] | | dRU2<br>[dRU484_2-512,dRU484_2+512],[-526:2:-496],[498:2:528],-1012,12 | |

<table>
<tr><td rowspan="4">106-tone dRU<br>i=1:16</td><td>dRU1<br>[-1011:72:-579,-475:72:-43,69:72:429,533:72:965]<br>[-995:72:-563,-459:72:-99,13:72:445,549:72:981]<br>[-979:72:-547,-443:72:-83,29:72:461,565:72:925]<br>[-955:72:-595,-491:72:-59,45:72:477,581:72:941]</td><td>dRU2<br>[-1003:72:-571,-467:72:-35,77:72:437,541:72:973]<br>[-987:72:-555,-451:72:-91,21:72:453,557:72:989]<br>[-971:72:-539,-435:72:-75,37:72:469,573:72:933]<br>[-947:72:-587,-483:72:-51,53:72:485,589:72:949]</td><td>dRU3<br>[-1007:72:-1007,-943:72:-583,-479:72:-47,65:72:961]<br>[-991:72:-559,-455:72:-95,17:72:17,81:72:977]<br>[-975:72:-543,-439:72:-79,33:72:465,569:72:929]<br>[-959:72:-599,-495:72:-63,49:72:481,585:72:945]</td><td>dRU4<br>[-999:72:-999,-935:72:-575,-471:72:-39,73:72:969]<br>[-983:72:-551,-447:72:-87,25:72:25,89:72:985]<br>[-967:72:-535,-431:72:-71,41:72:473,577:72:937]<br>[-951:72:-591,-487:72:-55,57:72:489,593:72:953]</td></tr>
<tr><td>dRU5<br>[-1009:72:-577,-473:72:-41,71:72:431,535:72:967]<br>[-993:72:-561,-457:72:-97,15:72:447,551:72:983]<br>[-977:72:-545,-441:72:-81,31:72:463,567:72:927]<br>[-953:72:-593,-489:72:-57,47:72:479,583:72:943]</td><td>dRU6<br>[-1001:72:-569,-465:72:-33,79:72:439,543:72:975]<br>[-985:72:-553,-449:72:-89,23:72:455,559:72:991]<br>[-969:72:-537,-433:72:-73,39:72:471,575:72:935]<br>[-945:72:-585,-481:72:-49,55:72:487,591:72:951]</td><td>dRU7<br>[-1005:72:-1005,-941:72:-581,-477:72:-45,67:72:963]<br>[-989:72:-557,-453:72:-93,19:72:19,83:72:979]<br>[-973:72:-541,-437:72:-77,35:72:467,571:72:931]<br>[-957:72:-597,-493:72:-61,51:72:483,587:72:947]</td><td>dRU8<br>[-997:72:-997,-933:72:-573,-469:72:-37,75:72:971]<br>[-981:72:-549,-445:72:-85,27:72:27,91:72:987]<br>[-965:72:-533,-429:72:-69,43:72:475,579:72:939]<br>[-949:72:-589,-485:72:-53,59:72:491,595:72:955]</td></tr>
<tr><td>dRU9<br>[-1010:72:-578,-474:72:-42,70:72:430,534:72:966]<br>[-994:72:-562,-458:72:-98,14:72:446,550:72:982]<br>[-978:72:-546,-442:72:-82,30:72:462,566:72:926]<br>[-954:72:-594,-490:72:-58,46:72:478,582:72:942]</td><td>dRU10<br>[-1002:72:-570,-466:72:-34,78:72:438,542:72:974]<br>[-986:72:-554,-450:72:-90,22:72:454,558:72:990]<br>[-970:72:-538,-434:72:-74,38:72:470,574:72:934]<br>[-946:72:-586,-482:72:-50,54:72:486,590:72:950]</td><td>dRU11<br>[-1006:72:-1006,-942:72:-582,-478:72:-46,66:72:962]<br>[-990:72:-558,-454:72:-94,18:72:18,82:72:978]<br>[-974:72:-542,-438:72:-78,34:72:466,570:72:930]<br>[-958:72:-598,-494:72:-62,50:72:482,586:72:946]</td><td>dRU12<br>[-998:72:-998,-934:72:-574,-470:72:-38,74:72:970]<br>[-982:72:-550,-446:72:-86,26:72:26,90:72:986]<br>[-966:72:-534,-430:72:-70,42:72:474,578:72:938]<br>[-950:72:-590,-486:72:-54,58:72:490,594:72:954]</td></tr>
<tr><td>dRU13<br>[-1008:72:-576,-472:72:-40,72:72:432,536:72:968]<br>[-992:72:-560,-456:72:-96,16:72:448,552:72:984]<br>[-976:72:-544,-440:72:-80,32:72:464,568:72:928]<br>[-952:72:-592,-488:72:-56,48:72:480,584:72:944]</td><td>dRU14<br>[-1000:72:-568,-464:72:-32,80:72:440,544:72:976]<br>[-984:72:-552,-448:72:-88,24:72:456,560:72:992]<br>[-968:72:-536,-432:72:-72,40:72:472,576:72:936]<br>[-944:72:-584,-480:72:-48,56:72:488,592:72:952]</td><td>dRU15<br>[-1004:72:-1004,-940:72:-580,-476:72:-44,68:72:964]<br>[-988:72:-556,-452:72:-92,20:72:20,84:72:980]<br>[-972:72:-540,-436:72:-76,36:72:468,572:72:932]<br>[-956:72:-596,-492:72:-60,52:72:484,588:72:948]</td><td>dRU16<br>[-996:72:-996,-932:72:-572,-468:72:-36,76:72:972]<br>[-980:72:-548,-444:72:-84,28:72:28,92:72:988]<br>[-964:72:-532,-428:72:-68,44:72:476,580:72:940]<br>[-948:72:-588,-484:72:-52,60:72:492,596:72:956]</td></tr>
<tr><td rowspan="2">242-tone dRU<br>i=1:8</td><td>dRU1<br>[-1011:8:-531,-491:8:-19,13:8:493,533:8:1005]</td><td>dRU2<br>[-1007:8:-535,-495:8:-15,17:8:489,529:8:1009]</td><td>dRU3<br>[-1009:8:-529,-489:8:-17,15:8:495,535:8:1007]</td><td>dRU4<br>[-1005:8:-533,-493:8:-13,19:8:491,531:8:1011]</td></tr>
<tr><td>dRU5<br>[-1010:8:-530,-490:8:-18,14:8:494,534:8:1006]</td><td>dRU6<br>[-1006:8:-534,-494:8:-14,18:8:490,530:8:1010]</td><td>dRU7<br>[-1008:8:-528,-488:8:-16,16:8:496,536:8:1008]</td><td>dRU8<br>[-1004:8:-532,-492:8:-12,20:8:492,532:8:1012]</td></tr>
<tr><td rowspan="2">484-tone dRU<br>i=1:4</td><td colspan="2">dRU1<br>[-1011:4:-531,-495:4:-15,13:4:493,529:4:1009]</td><td colspan="2">dRU2<br>[-1009:4:-529,-493:4:-13,15:4:495,531:4:1011]</td></tr>
<tr><td colspan="2">dRU3<br>[-1010:4:-530,-494:4:-14,14:4:494,530:4:1010]</td><td colspan="2">dRU4<br>[-1008:4:-528,-492:4:-12,16:4:496,532:4:1012]</td></tr>
<tr><td>996-tone dRU<br>i=1:2</td><td colspan="2">dRU1<br>[-1011:2:-515,-509:2:-13,13:2:509,515:2:1011]</td><td colspan="2">dRU2<br>[-1012:2:-516,-508:2:-12,12:2:508,516:2:1012]</td></tr>
</table>

Figure 28:
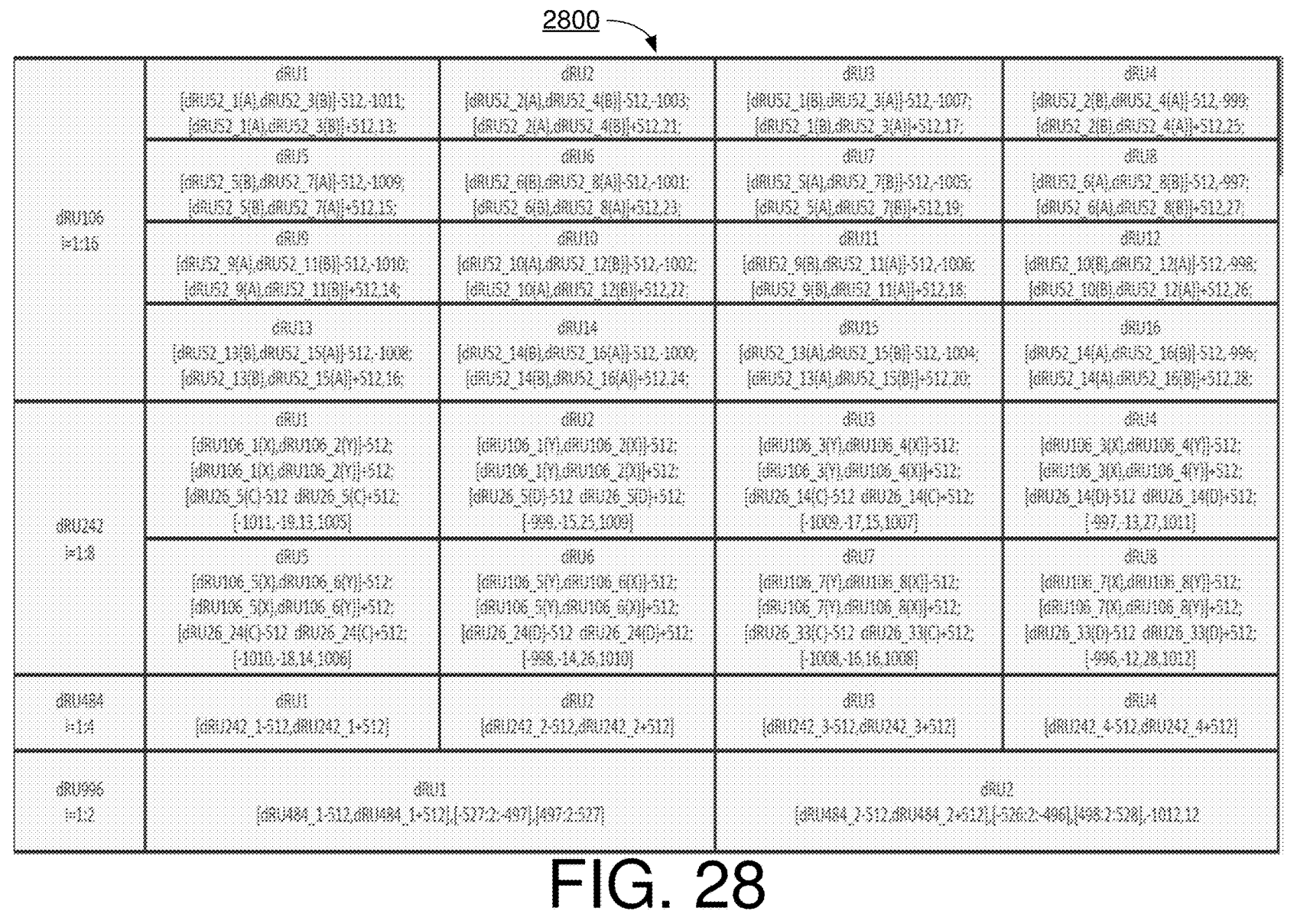

| | | | | |
|---|---|---|---|---|
| dRU106<br>i=1:16 | dRU1<br>[dRU52_1(A),dRU52_3(B)]-512,-1011;<br>[dRU52_1(A),dRU52_3(B)]+512,13; | dRU2<br>[dRU52_2(A),dRU52_4(B)]-512,-1003;<br>[dRU52_2(A),dRU52_4(B)]+512,21; | dRU3<br>[dRU52_1(B),dRU52_3(A)]-512,-1007;<br>[dRU52_1(B),dRU52_3(A)]+512,17; | dRU4<br>[dRU52_2(B),dRU52_4(A)]-512,-999;<br>[dRU52_2(B),dRU52_4(A)]+512,25; |
| | dRU5<br>[dRU52_5(B),dRU52_7(A)]-512,-1009;<br>[dRU52_5(B),dRU52_7(A)]+512,15; | dRU6<br>[dRU52_6(B),dRU52_8(A)]-512,-1001;<br>[dRU52_6(B),dRU52_8(A)]+512,23; | dRU7<br>[dRU52_5(A),dRU52_7(B)]-512,-1005;<br>[dRU52_5(A),dRU52_7(B)]+512,19; | dRU8<br>[dRU52_6(A),dRU52_8(B)]-512,-997;<br>[dRU52_6(A),dRU52_8(B)]+512,27; |
| | dRU9<br>[dRU52_9(A),dRU52_11(B)]-512,-1010;<br>[dRU52_9(A),dRU52_11(B)]+512,14; | dRU10<br>[dRU52_10(A),dRU52_12(B)]-512,-1002;<br>[dRU52_10(A),dRU52_12(B)]+512,22; | dRU11<br>[dRU52_9(B),dRU52_11(A)]-512,-1006;<br>[dRU52_9(B),dRU52_11(A)]+512,18; | dRU12<br>[dRU52_10(B),dRU52_12(A)]-512,-998;<br>[dRU52_10(B),dRU52_12(A)]+512,26; |
| | dRU13<br>[dRU52_13(B),dRU52_15(A)]-512,-1008;<br>[dRU52_13(B),dRU52_15(A)]+512,16; | dRU14<br>[dRU52_14(B),dRU52_16(A)]-512,-1000;<br>[dRU52_14(B),dRU52_16(A)]+512,24; | dRU15<br>[dRU52_13(A),dRU52_15(B)]-512,-1004;<br>[dRU52_13(A),dRU52_15(B)]+512,20; | dRU16<br>[dRU52_14(A),dRU52_16(B)]-512,-996;<br>[dRU52_14(A),dRU52_16(B)]+512,28; |
| dRU242<br>i=1:8 | dRU1<br>[dRU106_1(X),dRU106_2(Y)]-512;<br>[dRU106_1(X),dRU106_2(Y)]+512;<br>[dRU26_5(C)-512 dRU26_5(C)+512;<br>[-1011,-19,13,1005] | dRU2<br>[dRU106_1(Y),dRU106_2(X)]-512;<br>[dRU106_1(Y),dRU106_2(X)]+512;<br>[dRU26_5(D)-512 dRU26_5(D)+512;<br>[-999,-15,25,1009] | dRU3<br>[dRU106_3(Y),dRU106_4(X)]-512;<br>[dRU106_3(Y),dRU106_4(X)]+512;<br>[dRU26_14(C)-512 dRU26_14(C)+512;<br>[-1009,-17,15,1007] | dRU4<br>[dRU106_3(X),dRU106_4(Y)]-512;<br>[dRU106_3(X),dRU106_4(Y)]+512;<br>[dRU26_14(D)-512 dRU26_14(D)+512;<br>[-997,-13,27,1011] |
| | dRU5<br>[dRU106_5(X),dRU106_6(Y)]-512;<br>[dRU106_5(X),dRU106_6(Y)]+512;<br>[dRU26_24(C)-512 dRU26_24(C)+512;<br>[-1010,-18,14,1006] | dRU6<br>[dRU106_5(Y),dRU106_6(X)]-512;<br>[dRU106_5(Y),dRU106_6(X)]+512;<br>[dRU26_24(D)-512 dRU26_24(D)+512;<br>[-998,-14,26,1010] | dRU7<br>[dRU106_7(Y),dRU106_8(X)]-512;<br>[dRU106_7(Y),dRU106_8(X)]+512;<br>[dRU26_33(C)-512 dRU26_33(C)+512;<br>[-1008,-16,16,1008] | dRU8<br>[dRU106_7(X),dRU106_8(Y)]-512;<br>[dRU106_7(X),dRU106_8(Y)]+512;<br>[dRU26_33(D)-512 dRU26_33(D)+512;<br>[-996,-12,28,1012] |
| dRU484<br>i=1:4 | dRU1<br>[dRU242_1-512,dRU242_1+512] | dRU2<br>[dRU242_2-512,dRU242_2+512] | dRU3<br>[dRU242_3-512,dRU242_3+512] | dRU4<br>[dRU242_4-512,dRU242_4+512] |
| dRU996<br>i=1:2 | dRU1<br>[dRU484_1-512,dRU484_1+512],[-527:2:-497],[497:2:527] | | dRU2<br>[dRU484_2-512,dRU484_2+512],[-526:2:-496],[498:2:528],-1012,12 | |

| | | | | |
|---|---|---|---|---|
| 106-tone dRU i=1:16 | dRU1<br>[-1011:72:-579,-475:72:-44,68:72:429,533:72:965]<br>[-995:72:-563,-459:72:-99,11:72:443,549:72:981]<br>[-979:72:-547,-443:72:-83,29:72:461,565:72:925]<br>[-959:72:-595,-491:72:-59,45:72:477,581:72:941] | dRU2<br>[-1003:72:-571,-467:72:-35,77:72:437,541:72:973]<br>[-987:72:-555,-451:72:-91,21:72:453,557:72:989]<br>[-971:72:-539,-435:72:-75,37:72:469,573:72:933]<br>[-947:72:-587,-483:72:-51,59:72:485,589:72:949] | dRU3<br>[-991:72:-559,-455:72:-95,33:72:465,569:72:929]<br>[-975:72:-543,-439:72:-79,49:72:481,585:72:945]<br>[-959:72:-599,-495:72:-63,65:72:425,529:72:961]<br>[-943:72:-583,-479:72:-47,81:72:441,545:72:977]<br>[-1007,17] | dRU4<br>[-983:72:-551,-447:72:-87,41:72:473,577:72:937]<br>[-967:72:-535,-431:72:-71,57:72:489,593:72:953]<br>[-951:72:-591,-487:72:-55,73:72:433,537:72:969]<br>[-935:72:-575,-471:72:-39,89:72:449,553:72:985]<br>[-999,25] |
| | dRU5<br>[-1009:72:-577,-473:72:-41,71:72:431,535:72:967]<br>[-993:72:-561,-457:72:-97,15:72:447,551:72:983]<br>[-977:72:-545,-441:72:-81,31:72:463,567:72:927]<br>[-953:72:-593,-489:72:-57,47:72:479,583:72:943] | dRU6<br>[-1001:72:-569,-465:72:-33,79:72:439,543:72:975]<br>[-985:72:-553,-449:72:-89,23:72:455,559:72:991]<br>[-969:72:-537,-433:72:-73,39:72:471,575:72:935]<br>[-945:72:-585,-481:72:-49,55:72:487,591:72:951] | dRU7<br>[-989:72:-557,-453:72:-93,35:72:467,571:72:931]<br>[-973:72:-541,-437:72:-77,51:72:483,587:72:947]<br>[-957:72:-597,-493:72:-61,67:72:427,531:72:963]<br>[-941:72:-581,-477:72:-45,83:72:443,547:72:979]<br>[-1005,19] | dRU8<br>[-981:72:-549,-445:72:-85,43:72:475,579:72:939]<br>[-965:72:-533,-429:72:-69,59:72:491,595:72:955]<br>[-949:72:-589,-485:72:-53,75:72:435,539:72:971]<br>[-933:72:-573,-469:72:-37,91:72:451,555:72:987]<br>[-997,27] |
| | dRU9<br>[-1010:72:-578,-474:72:-42,70:72:430,534:72:966]<br>[-994:72:-562,-458:72:-98,14:72:446,550:72:982]<br>[-978:72:-546,-442:72:-82,30:72:462,566:72:926]<br>[-954:72:-594,-490:72:-58,46:72:478,582:72:942] | dRU10<br>[-1002:72:-570,-466:72:-34,78:72:438,542:72:974]<br>[-986:72:-554,-450:72:-90,22:72:454,558:72:990]<br>[-970:72:-538,-434:72:-74,38:72:470,574:72:934]<br>[-946:72:-586,-482:72:-50,54:72:486,590:72:950] | dRU11<br>[-990:72:-558,-454:72:-94,34:72:466,570:72:930]<br>[-974:72:-542,-438:72:-78,50:72:482,586:72:946]<br>[-958:72:-598,-494:72:-62,66:72:426,530:72:962]<br>[-942:72:-582,-478:72:-46,82:72:442,546:72:978]<br>[-1006,18] | dRU12<br>[-982:72:-550,-446:72:-86,42:72:474,578:72:938]<br>[-966:72:-534,-430:72:-70,58:72:490,594:72:954]<br>[-950:72:-590,-486:72:-54,74:72:434,538:72:970]<br>[-934:72:-574,-470:72:-38,90:72:450,554:72:986]<br>[-998,26] |
| | dRU13<br>[-1008:72:-576,-472:72:-40,72:72:432,536:72:968]<br>[-992:72:-560,-456:72:-96,16:72:448,552:72:984]<br>[-976:72:-544,-440:72:-80,32:72:464,568:72:928]<br>[-952:72:-592,-488:72:-56,48:72:480,584:72:944] | dRU14<br>[-1000:72:-568,-464:72:-32,80:72:440,544:72:976]<br>[-984:72:-552,-448:72:-88,24:72:456,560:72:992]<br>[-968:72:-536,-432:72:-72,40:72:472,576:72:936]<br>[-944:72:-584,-480:72:-48,56:72:488,592:72:952] | dRU15<br>[-988:72:-556,-452:72:-92,36:72:468,572:72:932]<br>[-972:72:-540,-436:72:-76,52:72:484,588:72:948]<br>[-956:72:-596,-492:72:-60,68:72:428,532:72:964]<br>[-940:72:-580,-476:72:-44,84:72:444,548:72:980]<br>[-1004,20] | dRU16<br>[-980:72:-548,-444:72:-84,44:72:476,580:72:940]<br>[-964:72:-532,-428:72:-68,60:72:492,596:72:956]<br>[-948:72:-588,-484:72:-52,76:72:436,540:72:972]<br>[-932:72:-572,-468:72:-36,92:72:452,556:72:988]<br>[-996,28] |
| 242-tone dRU i=1:8 | dRU1<br>[-1011:8:-531,-491:8:-19,13:8:493,533:8:1005] | dRU2<br>[-1007:8:-535,-495:8:-15,17:8:489,529:8:1009] | dRU3<br>[-1009:8:-529,-489:8:-17,15:8:495,535:8:1007] | dRU4<br>[-1005:8:-533,-493:8:-13,19:8:491,531:8:1011] |
| | dRU5<br>[-1010:8:-530,-490:8:-18,14:8:494,534:8:1006] | dRU6<br>[-1006:8:-534,-494:8:-14,18:8:490,530:8:1010] | dRU7<br>[-1008:8:-528,-488:8:-16,16:8:496,536:8:1008] | dRU8<br>[-1004:8:-532,-492:8:-12,20:8:492,532:8:1012] |
| 484-tone dRU i=1:4 | dRU1<br>[-1011:4:-531,-495:4:-15,13:4:493,529:4:1009] | | dRU2<br>[-1009:4:-529,-493:4:-13,15:4:495,531:4:1011] | |
| | dRU3<br>[-1010:4:-530,-494:4:-14,14:4:494,530:4:1010] | | dRU4<br>[-1008:4:-528,-492:4:-12,16:4:496,532:4:1012] | |
| 996-tone dRU i=1:2 | dRU1<br>[-1011:2:-515,-509:2:-13,13:2:509,515:2:1011] | | dRU2<br>[-1012:2:-516,-508:2:-12,12:2:508,516:2:1012] | |

| | | | | |
|---|---|---|---|---|
| dRU106<br>i=1:16 | dRU1<br>[dRU52_1(A),dRU52_3(B)]-512,-1011;<br>[dRU52_1(A),dRU52_3(B)]+512,13; | dRU2<br>[dRU52_2(A),dRU52_4(B)]-512,-1003;<br>[dRU52_2(A),dRU52_4(B)]+512,21; | dRU3<br>[dRU52_1(B),dRU52_3(A)]-512,-23;<br>[dRU52_1(B),dRU52_3(A)]+512,1001; | dRU4<br>[dRU52_2(B),dRU52_4(A)]-512,-15;<br>[dRU52_2(B),dRU52_4(A)]+512,1009; |
| | dRU5<br>[dRU52_5(B),dRU52_7(A)]-512,-1009;<br>[dRU52_5(B),dRU52_7(A)]+512,15; | dRU6<br>[dRU52_6(B),dRU52_8(A)]-512,-1001;<br>[dRU52_6(B),dRU52_8(A)]+512,23; | dRU7<br>[dRU52_5(A),dRU52_7(B)]-512,-21;<br>[dRU52_5(A),dRU52_7(B)]+512,1003; | dRU8<br>[dRU52_6(A),dRU52_8(B)]-512,-13;<br>[dRU52_6(A),dRU52_8(B)]+512,1011; |
| | dRU9<br>[dRU52_9(A),dRU52_11(B)]-512,-1010;<br>[dRU52_9(A),dRU52_11(B)]+512,14; | dRU10<br>[dRU52_10(A),dRU52_12(B)]-512,-1002;<br>[dRU52_10(A),dRU52_12(B)]+512,22; | dRU11<br>[dRU52_9(B),dRU52_11(A)]-512,-22;<br>[dRU52_9(B),dRU52_11(A)]+512,1002; | dRU12<br>[dRU52_10(B),dRU52_12(A)]-512,-14;<br>[dRU52_10(B),dRU52_12(A)]+512,1010; |
| | dRU13<br>[dRU52_13(B),dRU52_15(A)]-512,-1008;<br>[dRU52_13(B),dRU52_15(A)]+512,16; | dRU14<br>[dRU52_14(B),dRU52_16(A)]-512,-1000;<br>[dRU52_14(B),dRU52_16(A)]+512,24; | dRU15<br>[dRU52_13(A),dRU52_15(B)]-512,-20;<br>[dRU52_13(A),dRU52_15(B)]+512,1004; | dRU16<br>[dRU52_14(A),dRU52_16(B)]-512,-12;<br>[dRU52_14(A),dRU52_16(B)]+512,1012; |
| dRU242<br>i=1:8 | dRU1<br>[dRU106_1(X),dRU106_2(Y)]-512;<br>[dRU106_1(X),dRU106_2(Y)]+512;<br>[dRU26_5(C)-512 dRU26_5(C)+512;<br>[-1011,-19,13,1005] | dRU2<br>[dRU106_1(Y),dRU106_2(X)]-512;<br>[dRU106_1(Y),dRU106_2(X)]+512;<br>[dRU26_5(D)-512 dRU26_5(D)+512;<br>[-999,-15,25,1009] | dRU3<br>[dRU106_3(Y),dRU106_4(X)]-512;<br>[dRU106_3(Y),dRU106_4(X)]+512;<br>[dRU26_14(C)-512 dRU26_14(C)+512;<br>[-1009,-17,15,1007] | dRU4<br>[dRU106_3(X),dRU106_4(Y)]-512;<br>[dRU106_3(X),dRU106_4(Y)]+512;<br>[dRU26_14(D)-512 dRU26_14(D)+512;<br>[-997,-13,27,1011] |
| | dRU5<br>[dRU106_5(X),dRU106_6(Y)]-512;<br>[dRU106_5(X),dRU106_6(Y)]+512;<br>[dRU26_24(C)-512 dRU26_24(C)+512;<br>[-1010,-18,14,1006] | dRU6<br>[dRU106_5(Y),dRU106_6(X)]-512;<br>[dRU106_5(Y),dRU106_6(X)]+512;<br>[dRU26_24(D)-512 dRU26_24(D)+512;<br>[-998,-14,26,1010] | dRU7<br>[dRU106_7(Y),dRU106_8(X)]-512;<br>[dRU106_7(Y),dRU106_8(X)]+512;<br>[dRU26_33(C)-512 dRU26_33(C)+512;<br>[-1008,-16,16,1008] | dRU8<br>[dRU106_7(X),dRU106_8(Y)]-512;<br>[dRU106_7(X),dRU106_8(Y)]+512;<br>[dRU26_33(D)-512 dRU26_33(D)+512;<br>[-996,-12,28,1012] |
| dRU484<br>i=1:4 | dRU1<br>[dRU242_1-512,dRU242_1+512] | dRU2<br>[dRU242_2-512,dRU242_2+512] | dRU3<br>[dRU242_3-512,dRU242_3+512] | dRU4<br>[dRU242_4-512,dRU242_4+512] |
| dRU996<br>i=1:2 | dRU1<br>[dRU484_1-512,dRU484_1+512],[-527:2:-497],[497:2:527] | | dRU2<br>[dRU484_2-512,dRU484_2+512],[-526:2:-496],[498:2:528],-1012,12 | |

```
ru26_bw80=[
    [-483:36:-51, 17:36:449];[-467:36:-35, 33:36:465];[-475:36:-43, 25:36:457];[-459:36:-27, 41:36:473];[-451:36:-19, 49:36:481]; ...
    [-479:36:-47, 21:36:453];[-463:36:-31, 37:36:469];[-471:36:-39, 29:36:461];[-455:36:-23, 45:36:477];[-477:36:-45, 23:36:455]; ...
    [-461:36:-29, 39:36:471];[-469:36:-37, 31:36:463];[-453:36:-21, 47:36:479];[-449:36:-17, 51:36:483];[-481:36:-49, 19:36:451]; ...
    [-465:36:-33, 35:36:467];[-473:36:-41, 27:36:459];[-457:36:-25, 43:36:475]; [NA]; ...
    [-482:36:-50, 18:36:450];[-466:36:-34, 34:36:466];[-474:36:-42, 26:36:458];[-458:36:-26, 42:36:474];[-450:36:-18, 50:36:482]; ...
    [-478:36:-46, 22:36:454];[-462:36:-30, 38:36:470];[-470:36:-38, 30:36:462];[-454:36:-22, 46:36:478];[-476:36:-44, 24:36:456]; ...
    [-460:36:-28, 40:36:472];[-468:36:-36, 32:36:464];[-452:36:-20,48:36:480];[-448:36:-16, 52:36:484];[-480:36:-48, 20:36:452]; ...
    [-464:36:-32, 36:36:468];[-472:36:-40, 28:36:460];[-456:36:-24, 44:36:476]];
    %<-- NOTE:  RU(19) is not defined and labled as [NA]
```

| | | | | |
|---|---|---|---|---|
| 106-tone dRU<br>i=1:16 | dRU1<br>[-1011:72:-579,-475:72:-43,69:72:429,533:72:965]<br>[-995:72:-563,-459:72:-99,13:72:445,549:72:981]<br>[-979:72:-547,-443:72:-83,29:72:461,565:72:925]<br>[-955:72:-595,-491:72:-59,45:72:477,581:72:941] | dRU2<br>[-1003:72:-571,-467:72:-35,77:72:437,541:72:973]<br>[-987:72:-555,-451:72:-91,21:72:453,557:72:989]<br>[-971:72:-539,-435:72:-75,37:72:469,573:72:933]<br>[-947:72:-587,-483:72:-51,53:72:485,589:72:949] | dRU3<br>[-991:72:-559,-455:72:-23,81:72:441,545:72:977]<br>[-975:72:-543,-439:72:-79,33:72:465,569:72:1001]<br>[-959:72:-599,-495:72:-63,49:72:481,585:72:945]<br>[-943:72:-583,-479:72:-47,65:72:425,529:72:961] | dRU4<br>[-983:72:-551,-447:72:-15,89:72:449,553:72:985]<br>[-967:72:-535,-431:72:-71,41:72:473,577:72:1009]<br>[-951:72:-591,-487:72:-55,57:72:489,593:72:953]<br>[-935:72:-575,-471:72:-39,73:72:433,537:72:969] |
| | dRU5<br>[-1009:72:-577,-473:72:-41,71:72:431,535:72:967]<br>[-993:72:-561,-457:72:-97,15:72:447,551:72:983]<br>[-977:72:-545,-441:72:-81,31:72:463,567:72:927]<br>[-953:72:-593,-489:72:-57,47:72:479,583:72:943] | dRU6<br>[-1001:72:-569,-465:72:-33,79:72:439,543:72:975]<br>[-985:72:-553,-449:72:-89,23:72:455,559:72:991]<br>[-969:72:-537,-433:72:-73,39:72:471,575:72:935]<br>[-945:72:-585,-481:72:-49,55:72:487,591:72:951] | dRU7<br>[-989:72:-557,-453:72:-21,83:72:443,547:72:979]<br>[-973:72:-541,-437:72:-77,35:72:467,571:72:1003]<br>[-957:72:-597,-493:72:-61,51:72:483,587:72:947]<br>[-941:72:-581,-477:72:-45,67:72:427,531:72:963] | dRU8<br>[-981:72:-549,-445:72:-13,91:72:451,555:72:987]<br>[-965:72:-533,-429:72:-69,43:72:475,579:72:1011]<br>[-949:72:-589,-485:72:-53,59:72:491,595:72:955]<br>[-933:72:-573,-469:72:-37,75:72:435,539:72:971] |
| | dRU9<br>[-1010:72:-578,-474:72:-42,70:72:430,534:72:966]<br>[-994:72:-562,-458:72:-98,14:72:446,550:72:982]<br>[-978:72:-546,-442:72:-82,30:72:462,566:72:926]<br>[-954:72:-594,-490:72:-58,46:72:478,582:72:942] | dRU10<br>[-1002:72:-570,-466:72:-34,78:72:438,542:72:974]<br>[-986:72:-554,-450:72:-90,22:72:454,558:72:990]<br>[-970:72:-538,-434:72:-74,38:72:470,574:72:934]<br>[-946:72:-586,-482:72:-50,54:72:486,590:72:950] | dRU11<br>[-990:72:-558,-454:72:-22,82:72:442,546:72:978]<br>[-974:72:-542,-438:72:-78,34:72:466,570:72:1002]<br>[-958:72:-598,-494:72:-62,50:72:482,586:72:946]<br>[-942:72:-582,-478:72:-46,66:72:426,530:72:962] | dRU12<br>[-982:72:-550,-446:72:-14,90:72:450,554:72:986]<br>[-966:72:-534,-430:72:-70,42:72:474,578:72:1010]<br>[-950:72:-590,-486:72:-54,58:72:490,594:72:954]<br>[-934:72:-574,-470:72:-38,74:72:434,538:72:970] |
| | dRU13<br>[-1008:72:-576,-472:72:-40,72:72:432,536:72:968]<br>[-992:72:-560,-456:72:-96,16:72:448,552:72:984]<br>[-976:72:-544,-440:72:-80,32:72:464,568:72:928]<br>[-952:72:-592,-488:72:-56,48:72:480,584:72:944] | dRU14<br>[-1000:72:-568,-464:72:-32,80:72:440,544:72:976]<br>[-984:72:-552,-448:72:-88,24:72:456,560:72:992]<br>[-968:72:-536,-432:72:-72,40:72:472,576:72:936]<br>[-944:72:-584,-480:72:-48,56:72:488,592:72:952] | dRU15<br>[-988:72:-556,-452:72:-20,84:72:444,548:72:980]<br>[-972:72:-540,-436:72:-76,36:72:468,572:72:1004]<br>[-956:72:-596,-492:72:-60,52:72:484,588:72:948]<br>[-940:72:-580,-476:72:-44,68:72:428,532:72:964] | dRU16<br>[-980:72:-548,-444:72:-12,92:72:452,556:72:988]<br>[-964:72:-532,-428:72:-68,44:72:476,580:72:1012]<br>[-948:72:-588,-484:72:-52,60:72:492,596:72:956]<br>[-932:72:-572,-468:72:-36,76:72:436,540:72:972] |
| 242-tone dRU<br>i=1:8 | dRU1<br>[-1011:8:-531,-491:8:-19,13:8:493,533:8:1005] | dRU2<br>[-1007:8:-535,-495:8:-15,17:8:489,529:8:1009] | dRU3<br>[-1009:8:-529,-489:8:-17,15:8:495,535:8:1007] | dRU4<br>[-1005:8:-533,-493:8:-13,19:8:491,531:8:1011] |
| | dRU5<br>[-1010:8:-530,-490:8:-18,14:8:494,534:8:1006] | dRU6<br>[-1006:8:-534,-494:8:-14,18:8:490,530:8:1010] | dRU7<br>[-1008:8:-528,-488:8:-16,16:8:496,536:8:1008] | dRU8<br>[-1004:8:-532,-492:8:-12,20:8:492,532:8:1012] |
| 484-tone dRU<br>i=1:4 | dRU1<br>[-1011:4:-531,-495:4:-15,13:4:493,529:4:1009] | | dRU2<br>[-1009:4:-529,-493:4:-13,15:4:495,531:4:1011] | |
| | dRU3<br>[-1010:4:-530,-494:4:-14,14:4:494,530:4:1010] | | dRU4<br>[-1008:4:-528,-492:4:-12,16:4:496,532:4:1012] | |
| 996-tone dRU<br>i=1:2 | dRU1<br>[-1011:2:-515,-509:2:-13,13:2:509,515:2:1011] | | dRU2<br>[-1012:2:-516,-508:2:-12,12:2:508,516:2:1012] | |

| | | | | |
|---|---|---|---|---|
| dRU106 i=1:16 | dRU1 [dRU242_1(U)-512, dRU242_1(U)+512] | dRU2 [dRU242_1(U+2)-512, dRU242_1(U+2)+512] | dRU3 [dRU242_1(V)-512, dRU242_1(V)+512] | dRU4 [dRU242_1(V+2)-512, dRU242_1(V+2)+512] |
| | dRU5 [dRU242_2(U)-512, dRU242_2(U)+512] | dRU6 [dRU242_2(U+2)-512, dRU242_2(U+2)+512] | dRU7 [dRU242_2(V)-512, dRU242_2(V)+512] | dRU8 [dRU242_2(V+2)-512, dRU242_2(V+2)+512] |
| | dRU9 [dRU242_3(U)-512, dRU242_3(U)+512] | dRU10 [dRU242_3(U+2)-512, dRU242_3(U+2)+512] | dRU11 [dRU242_3(V)-512, dRU242_3(V)+512] | dRU12 [dRU242_3(V+2)-512, dRU242_3(V+2)+512] |
| | dRU13 [dRU242_4(U)-512, dRU242_4(U)+512] | dRU14 [dRU242_4(U+2)-512, dRU242_4(U+2)+512] | dRU15 [dRU242_4(V)-512, dRU242_4(V)+512] | dRU16 [dRU242_4(V+2)-512, dRU242_4(V+2)+512] |
| dRU242 i=1:8 | dRU1 [dRU242_1(1:2:end-512, [dRU242_1(1:2:end)+512] | dRU2 [dRU242_1(2:2:end-512, [dRU242_1(2:2:end)+512] | dRU3 [dRU242_2(1:2:end-512, [dRU242_2(1:2:end)+512] | dRU4 [dRU242_2(2:2:end-512, [dRU242_2(2:2:end)+512] |
| | dRU5 [dRU242_3(1:2:end-512, [dRU242_3(1:2:end)+512] | dRU6 [dRU242_3(2:2:end-512, [dRU242_3(2:2:end)+512] | dRU7 [dRU242_4(1:2:end-512, [dRU242_4(1:2:end)+512] | dRU8 [dRU242_4(2:2:end-512, [dRU242_4(2:2:end)+512] |
| dRU484 i=1:4 | dRU1 [dRU242_1-512,dRU242_1+512] | dRU2 [dRU242_2-512,dRU242_2+512] | dRU3 [dRU242_3-512,dRU242_3+512] | dRU4 [dRU242_4-512,dRU242_4+512] |
| dRU996 i=1:2 | dRU1 [dRU484_1-512,dRU484_1+512],[-527:2:-515, -509:2:-497],[497:2:509,515:2:527] | | dRU2 [dRU484_2-512,dRU484_2+512],[-526:2:-516, -508:2:-496],[498:2:508,516:2:528],-1012,12 | |

| | | | | |
|---|---|---|---|---|
| 106-tone dRU i=1:16 | dRU1 [-1011:72:-579,-475:72:-43,69:72:429,533:72:965] [-995:72:-563,-459:72:-99,13:72:445,549:72:981] [-979:72:-547,-443:72:-83,29:72:461,565:72:925] [-955:72:-595,-491:72:-59,45:72:477,561:72:941] | dRU2 dRU1+8 | dRU3 [-991:72:-559,-455:72:-23,81:72:441,545:72:977] [-975:72:-543,-439:72:-79,33:72:465,569:72:1001] [-959:72:-599,-495:72:-63,49:72:481,565:72:945] [-943:72:-583,-479:72:-47,65:72:425,529:72:961] | dRU4 dRU3+8 |
| | dRU5 dRU1+2 | dRU6 dRU1+10 | dRU7 dRU3+2 | dRU8 dRU3+10 |
| | dRU9 dRU1+1 | dRU10 dRU1+9 | dRU11 dRU3+1 | dRU12 dRU3+9 |
| | dRU13 dRU1+3 | dRU14 dRU1+11 | dRU15 dRU3+3 | dRU16 dRU3+11 |
| 242-tone dRU i=1:8 | dRU1 [-1011:8:-531,-491:8:-11,13:8:493,533:8:1005] | dRU2 [-1007:8:-535,-495:8:-15,17:8:489,529:8:1009] | dRU3 dRU1+2 | dRU4 dRU2+2 |
| | dRU5 dRU1+1 | dRU6 dRU2+1 | dRU7 dRU1+3 | dRU8 dRU2+3 |
| 484-tone dRU i=1:4 | dRU1 [-1011:4:-531,-495:4:-15,13:4:493,529:4:1009] | | dRU2 dRU1+2 | |
| | dRU3 dRU1+1 | | dRU4 dRU1+3 | |
| 996-tone dRU i=1:2 | dRU1 [-1011:2:-515,-509:2:-13,13:2:509,515:2:1011] | | dRU2 [-1012:2:-516,-508:2:-12,12:2:508,516:2:1012] | |

GENERATE, BY A PROCESSOR OF AN APPARATUS, A DISTRIBUTED-TONE RESOURCE UNIT (DRU) USING A 80MHZ DRU TONE PLAN AS A BASIC BUILDING BLOCK

3610

PERFORM, BY THE PROCESSOR, A WIRELESS COMMUNICATION IN A 160MHZ OR 320MHZ DISTRIBUTION BANDWIDTH WITH THE DRU

3620

DISTRIBUTED-TONE RESOURCE UNIT (dRU) PLAN IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/377,556, 63/507,132 and 63/507,485, filed 29 Sep. 2022, 9 Jun. 2023 and 12 Jun. 2023, respectively, the contents of which herein being incorporated by reference in their entirety.

TECHNICAL FIELD

The present disclosure is generally related to wireless communications and, more particularly, to 80 MHz distributed-tone resource unit tone plan-based dRU designs for wide distribution bandwidths 160 MHz and 320 MHz in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, distributed-tone RU (dRU) has been considered as one efficient method to boost transmission power and improve coverage for 6 GHz low-power indoor (LPI) systems. Moreover, dRU tone plans for bandwidth 80 MHz have been well studied and proposed previously. For next-generation wireless local area networks (WLANs), there may be more Wi-Fi devices operated in the 6 GHz frequency band with a wider bandwidth, such as 160 MHz. However, dRU tone plan designs for wider distribution bandwidths such as 160 MHz and 320 MHz have yet to be specified at the present time. Therefore, there is a need for a solution of 80 MHz dRU tone plan-based dRU designs for wide distribution bandwidths 160 MHz and 320 MHz in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to 80 MHz dRU tone plan-based dRU designs for wide distribution bandwidths 160 MHz and 320 MHz in wireless communications. Under various proposed schemes in accordance with the present disclosure, a 26-tone dRU may be used as a basic building block to generate dRU(s) of other size(s) and the hierarchical structure for dRUs on BW160 may be preserved. Under the proposed schemes, 80 MHz dRU tone plan may be utilized as a basic building block to generate or otherwise construct dRU subcarrier indices for wide distribution bandwidths of 160

MHz and 320 MHz. Moreover, the dRU design methods proposed herein may enable mixed-distribution bandwidth operations for 80 MHz, 160 MHz and 320 MHz. It is believed that implementations of one or more of the proposed schemes may achieve optimal power boost gains.

In one aspect, a method may involve generating a dRU using a 80 MHz dRU tone plan as a basic building block. The method may also involve performing a wireless communication in a 160 MHz or 320 MHz distribution bandwidth with the dRU.

In another aspect, an apparatus may include a transceiver configured to communicate wirelessly and a processor coupled to the transceiver. The processor may generate a dRU using a 80 MHz dRU tone plan as a basic building block. The processor may also perform a wireless communication in a 160 MHz or 320 MHz distribution bandwidth with the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example scenario under a proposed scheme in accordance with the present disclosure.

FIG. 3 is a diagram of an example scenario under a proposed scheme in accordance with the present disclosure.

FIG. 4 is a diagram of an example scenario under a proposed scheme in accordance with the present disclosure.

FIG. 5 is a diagram of an example scenario under a proposed scheme in accordance with the present disclosure.

FIG. 11 is a diagram of an example design under a proposed scheme in accordance with the present disclosure.

FIG. 21 is a diagram of an example design under a proposed scheme in accordance with the present disclosure.

FIG. 26 is a diagram of an example design under a proposed scheme in accordance with the present disclosure.

FIG. 27 is a diagram of an example design under a proposed scheme in accordance with the present disclosure.

FIG. 28 is a diagram of an example design under a proposed scheme in accordance with the present disclosure.

FIG. 29 is a diagram of an example design under a proposed scheme in accordance with the present disclosure.

FIG. 30 is a diagram of an example design under a proposed scheme in accordance with the present disclosure.

FIG. 31 is a diagram of an example design under a proposed scheme in accordance with the present disclosure.

FIG. 32 is a diagram of an example design under a proposed scheme in accordance with the present disclosure.

FIG. 33 is a diagram of an example design under a proposed scheme in accordance with the present disclosure.

FIG. 34 is a diagram of an example design under a proposed scheme in accordance with the present disclosure.

DETAILED DESCRIPTION OF PREFERRED EMBODIMENTS

Figure 1:
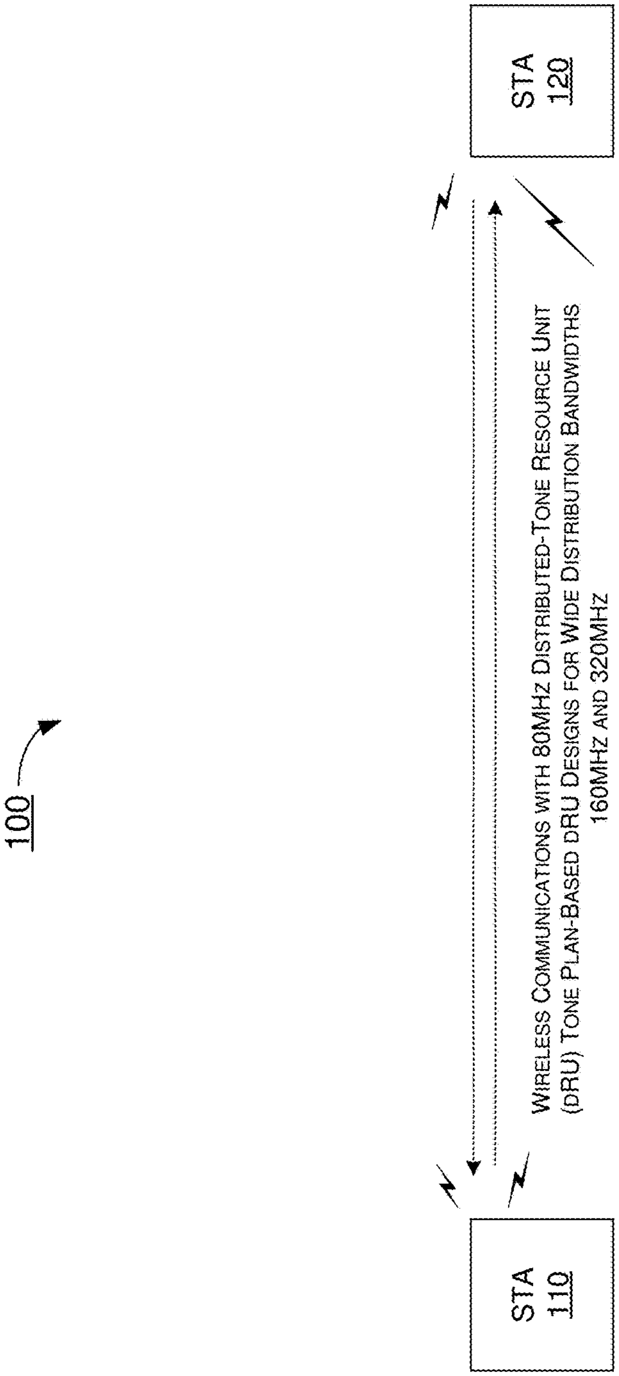
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to 80 MHz dRU tone plan-based dRU designs for wide distribution bandwidths 160 MHz and 320 MHz in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, a 26-tone distributed-tone RU may be interchangeably denoted as dRU26 (or iRU26), a 52-tone distributed-tone RU may be interchangeably denoted as dRU52 (or iRU52), a 106-tone distributed-tone RU may be interchangeably denoted as dRU106 (or iRU106), a 242-tone distributed-tone RU may be interchangeably denoted as dRU242 (or iRU242), and so on. Furthermore, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, an aggregate (26+52)-tone distributed-tone MRU (dMRU) may be interchangeably denoted as dMRU132, and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

FIG. 1 illustrates an example network environment 100 in which various solutions and schemes in accordance with the present disclosure may be implemented. FIG. 2~FIG. 36 illustrate examples of implementation of various proposed schemes in network environment 100 in accordance with the present disclosure. The following description of various proposed schemes is provided with reference to FIG. 1~FIG. 36.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the 80 MHz dRU tone plan-based dRU designs for wide distribution bandwidths 160 MHz and 320 MHz in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

FIG. 2 illustrates an example scenario 200 of dRU and dMRU distribution gains. Specifically, the table in FIG. 2 summarizes the dRU/dMRU performance in terms of the number of tones in 1 MHz and power boost gains in dB over a distribution bandwidth of 20 MHz, 40 MHz, 80 MHz, 160 MHz and 320 MHz.

FIG. 3 illustrates an example scenario 300 of consideration of dRU on BW160 and BW320. Under various proposed schemes in accordance with the present disclosure, different sizes of dRUs may be utilized for different distribution bandwidths, including 160 MHz and 320 MHz. For distribution bandwidth 160 MHz, under the proposed schemes, a 106-tone dRU may achieve a full distribution gain and there may be sixteen dRU106s which correspondingly support up to sixteen 106-tone orthogonal frequency-divisional multiple-access (OFDMA) users. For distribution bandwidth 320 MHz, under the proposed schemes, a minimum dRU size may be 484-tone dRU so as to avoid false preamble detection (PD) hit issue and to maintain uniform tone distribution for better channel smoothing. For instance, dRU106, dRU242, dRU484 and dRU996 may be supported on distribution bandwidth 160 MHz, as shown in FIG. 3. Moreover, dRU484, dRU996 and dRU(2×996) may be supported on distribution bandwidth 320 MHz, as shown in FIG. 3.

FIG. 4 illustrates an example scenario 400 of rRU transmission (Tx) power. Specifically, the table in FIG. 4 summarizes the Tx power of a rRU for a non-AP STA in a 6 GHz LPI system. The maximum Tx power of each RU, especially small-size RU, is limited by the PSD requirement of −1 dBm/MHz in the LPI system.

FIG. 5 illustrates an example scenario 500 of dRU Tx power. Referring to FIG. 5, by distributing the tones over a wider bandwidth, the maximum Tx power may be significantly boosted. Notably, the maximum Tx power of a non-AP STA with a dRU on BW160 and BW320 is not beyond the LPI maximum power limit of 24 dBm.

Under various proposed schemes in accordance with the present disclosure, the 80 MHz dRU tone plan may be used as a basic building block in generating or otherwise constructing the tone plan of a dRU on BW160 and BW320. That is, the fundamental design principles of a dRU on BW160 and BW320 may be similar with dRU design on BW80. Accordingly, the hierarchical structure of dRU may be preserved, and there is no tone overlap and no new dRU size is introduced. Advantageously, optimal power boost gains may be achieved, with uniform or near-uniform tone distribution patterns and with near-evenly distributed pilot tones. Under the proposed schemes, operations with mixed-distribution bandwidths with flexible scheduling may be performed. Almost all dRUs may be generated with perfectly uniform distribution pattern (except for dRU106 on BW160). Moreover, enough edge tones (e.g., left twelve tones and right eleven tones) may be reserved for each 80 MHz and 160 MHz frequency subblock/segment, and enough direct-current (DC) tones (e.g., greater than or equal to seven DC tones) may be reserved for each 80 MHz and 160 MHz frequency subblock/segment. Under the proposed schemes, tones may be distributed over a non-OFDMA tone plan in each 80 MHz frequency segment. Additionally, generation of dRU subcarrier indices under the proposed schemes may achieve peak-to-average-power ratio (PAPR) reduction. Furthermore, simple dRU signaling may also be achieved under the proposed schemes.

Figure 6:
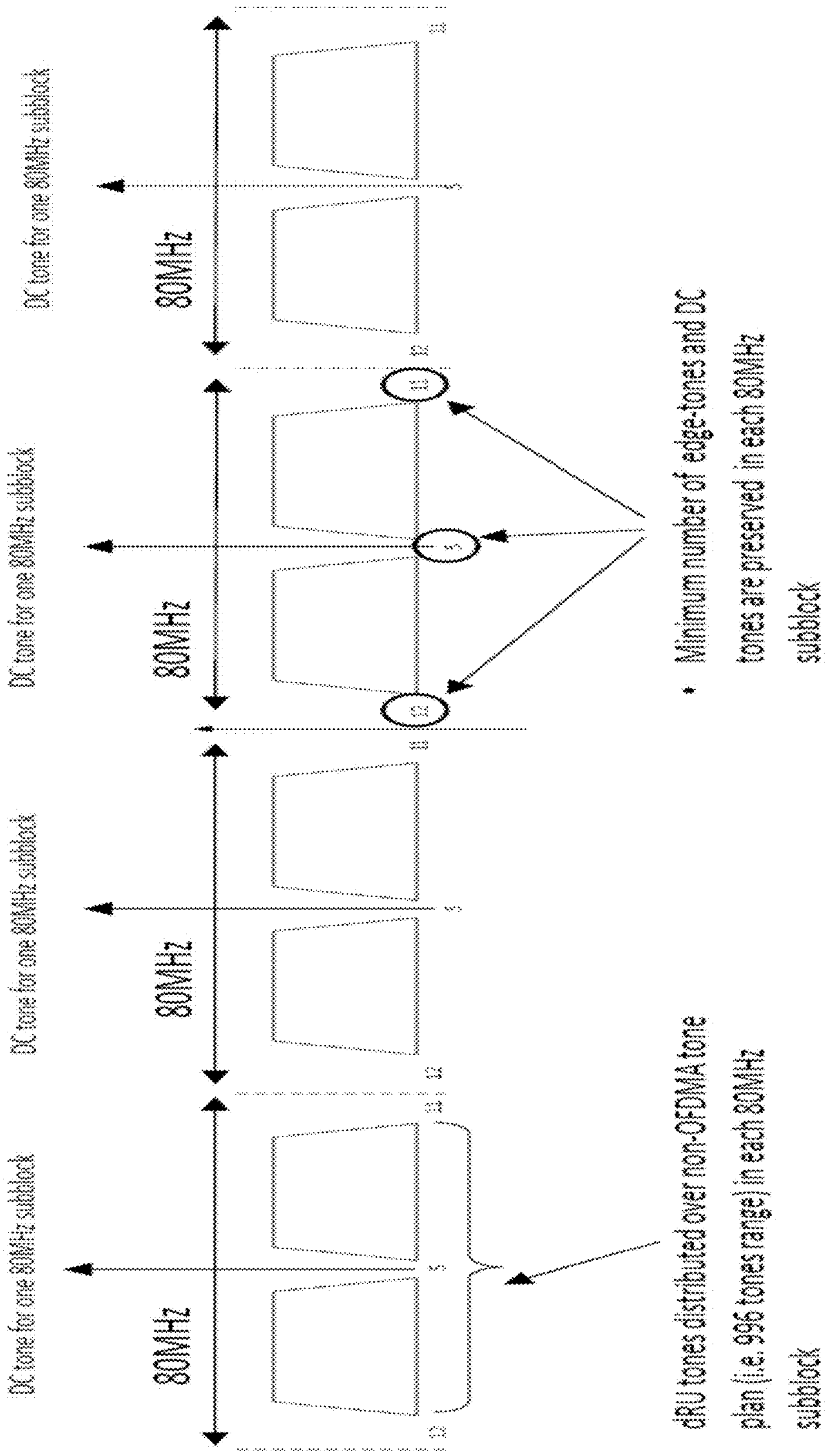
FIG. 6 is a diagram of an example scenario under a proposed scheme in accordance with the present disclosure.

FIG. 6 illustrates an example scenario 600 under a proposed scheme in accordance with the present disclosure. Scenario 600 may pertain to a range of dRU tone distribution over a wide bandwidth such as 160 MHz or 320 MHz. Referring to FIG. 6, under the proposed scheme, dRU tones may be distributed over a non-OFDMA tone plan (e.g., a range of 996 tones) in each 80 MHz frequency subblock/segment. Moreover, a minimum number of edge tones and DC tones may be preserved in each 80 MHz frequency subblock/segment under the proposed scheme.

Figure 7:
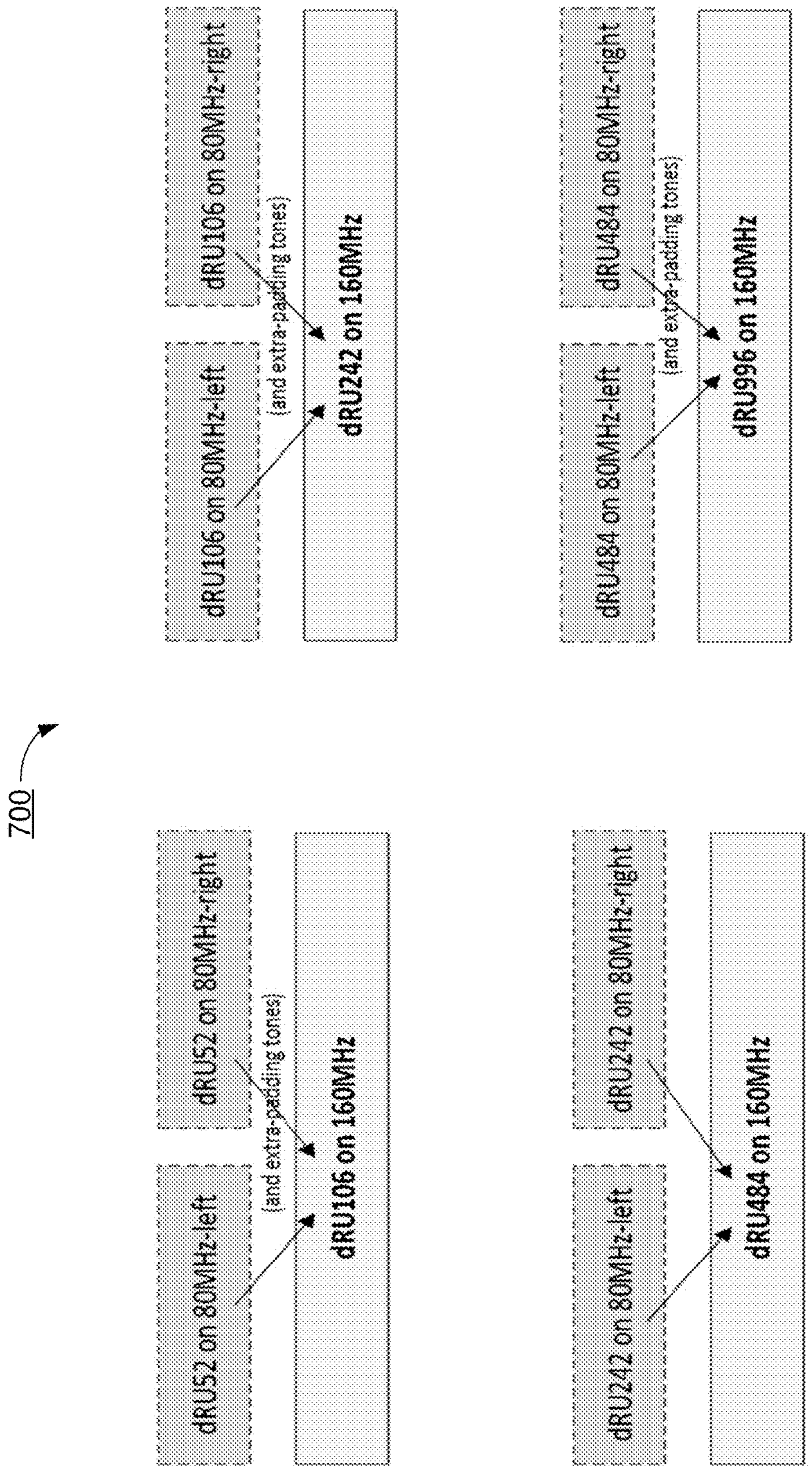
FIG. 7 is a diagram of an example design under a proposed scheme in accordance with the present disclosure.

FIG. 7 illustrates an example design 700 under a proposed scheme in accordance with the present disclosure. Design 700 may pertain to the construction of a 160 MHz dRU based on a 80 MHz dRU. Under the proposed scheme, a dRU on BW160 may be constructed by using the 80 MHz dRU tone plan as a basic building block. Referring to FIG. 7, a 106-tone dRU on 160 MHz may be built from two 52-tone dRUs on 80 MHz (one on the left and the other on the right), a 242-tone dRU on 160 MHz may be built from two 106-tone dRUs on 80 MHz (one on the left and the other on the right), a 484-tone dRU on 160 MHz may be built from two 242-tone dRUs on 80 MHz (one on the left and the other on the right), and a 996-tone dRU on 160 MHz may be built from two 484-tone dRUs on 80 MHz (one on the left and the other on the right).

Figure 8:
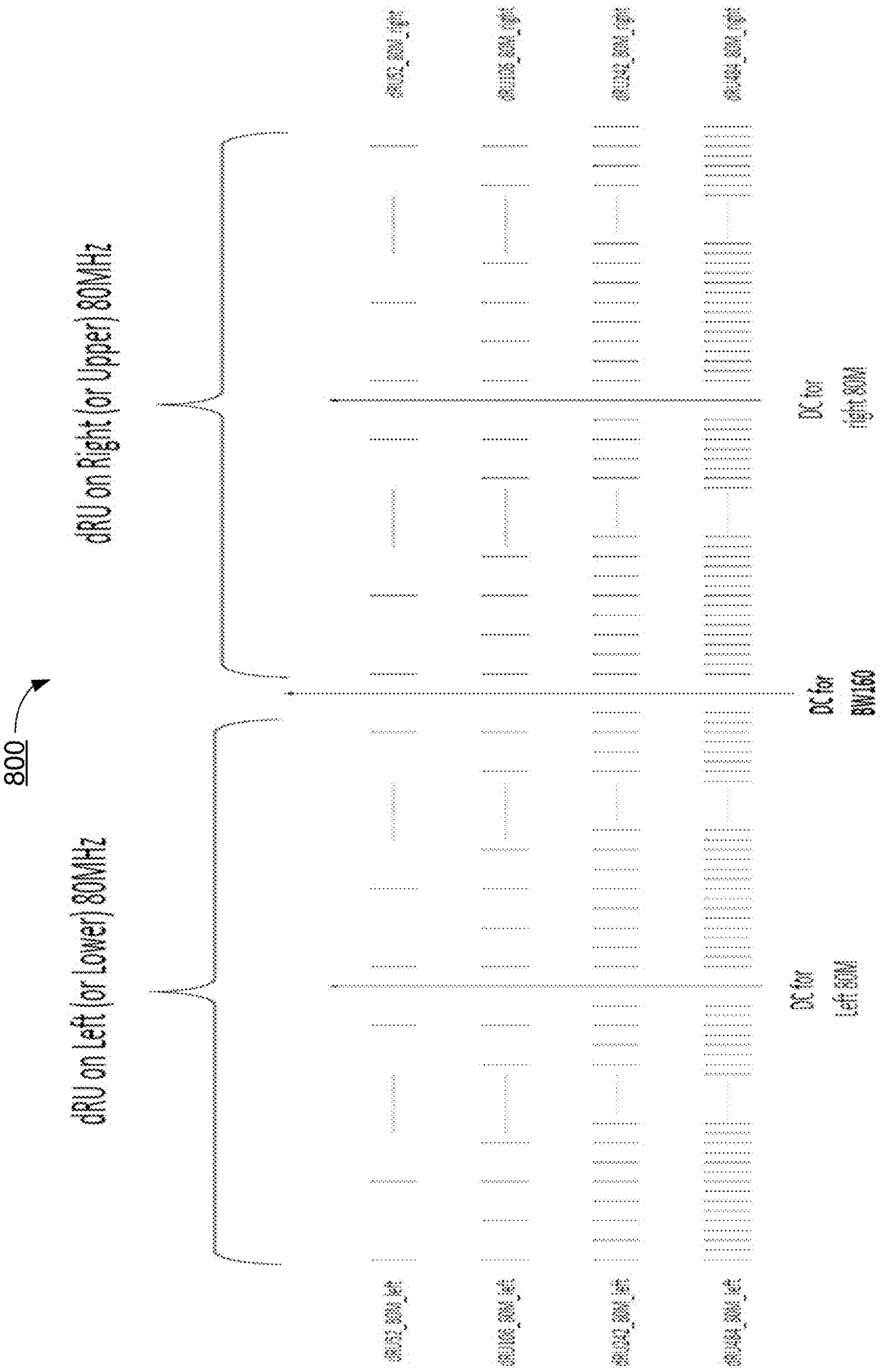
FIG. 8 is a diagram of an example design under a proposed scheme in accordance with the present disclosure.

FIG. 8 illustrates an example design 800 under a proposed scheme in accordance with the present disclosure. Design 800 may pertain to the design of a 160 MHz dRU based on a 80 MHz dRU tone plan. Under the proposed scheme, tones of a dRU on BW160 may be distributed over a left or lower 80 MHz frequency subblock (or segment) and a right or upper 80 MHz frequency subblock (or segment). Referring to FIG. 8, dRU106 on BW160=[dRU52_80M_left, dRU52_80M_right, extra tone padding], dRU242 on BW160=[dRU106_80M_left, dRU106_80M_right, extra tone padding], dRU484 on BW160=[dRU242_80M_left, dRU242_80M_right], and dRU996 on BW160=[dRU484_80M_left, dRU484_80M_right, extra tone padding].

Figure 9:
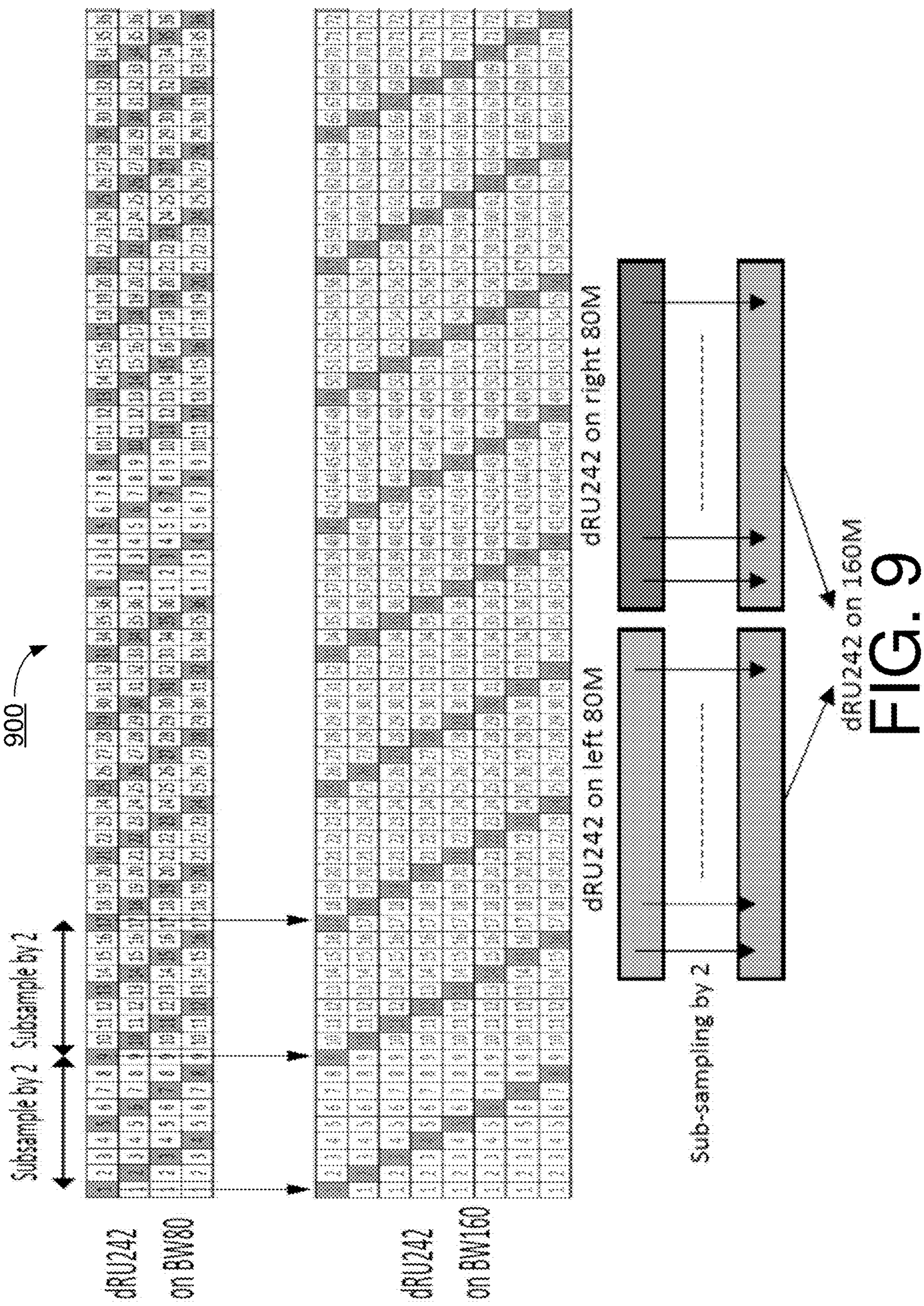
FIG. 9 is a diagram of an example design under a proposed scheme in accordance with the present disclosure.

FIG. 9 illustrates an example design 900 under a proposed scheme in accordance with the present disclosure. Design 900 may pertain to the construction of a 160 MHz dRU based on a 80 MHz dRU. Under the proposed scheme, an alternative way to design dRU242 on BW160 may involve sub-sampling a dRU242 on BW80 to construct a dRU242 on BW160.

Figure 10:
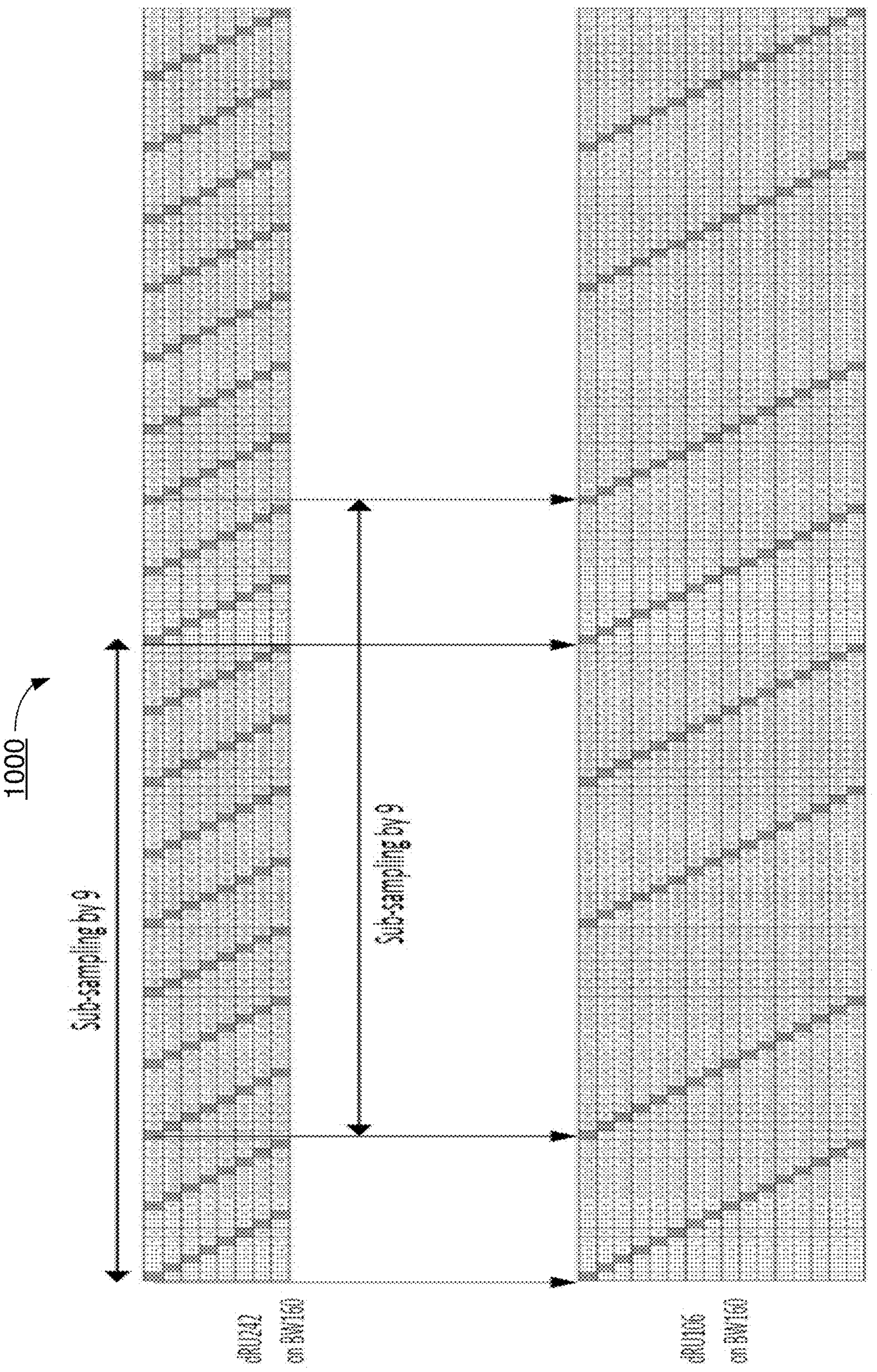
FIG. 10 is a diagram of an example design under a proposed scheme in accordance with the present disclosure.

FIG. 10 illustrates an example design 1000 under a proposed scheme in accordance with the present disclosure. Design 1000 may pertain to the construction of a 160 MHz dRU based on a 80 MHz dRU. Under the proposed scheme, once a dRU242 on BW160 is generated, a dRU106 on BW160 may also be generated by sub-sampling by 9 from the dRU242 of BW160, as shown in FIG. 10. As an example, a first dRU106 on BW160 may be built from a dRU242 on BW160 by sub-sampling by 9 as follows: sort([dru242{1}(1:9:1+91 3) dru242{1}(3:9:3+91 2) dru242{1}(6:9:6+91 2) dru242{1}(8:9:8+91 2) . . . dru242{1}(121+1:9:121+1+91 3) dru242{1}(121+3:9:121+3+91 2) dru242{1}(121+6:9:121+6+91 2) dru242{1}(121+8:9:121+8+91 2)]).

FIG. 11 illustrates an example design 1100 under a proposed scheme in accordance with the present disclosure. Design 1100 may pertain to a table of dRU subcarrier indices for BW160. Under the proposed scheme, data and pilot subcarrier indices for dRUs in a 160 MHz physical-layer protocol data unit (PPDU) may be generated according to the table shown in FIG. 11.

Figure 12:
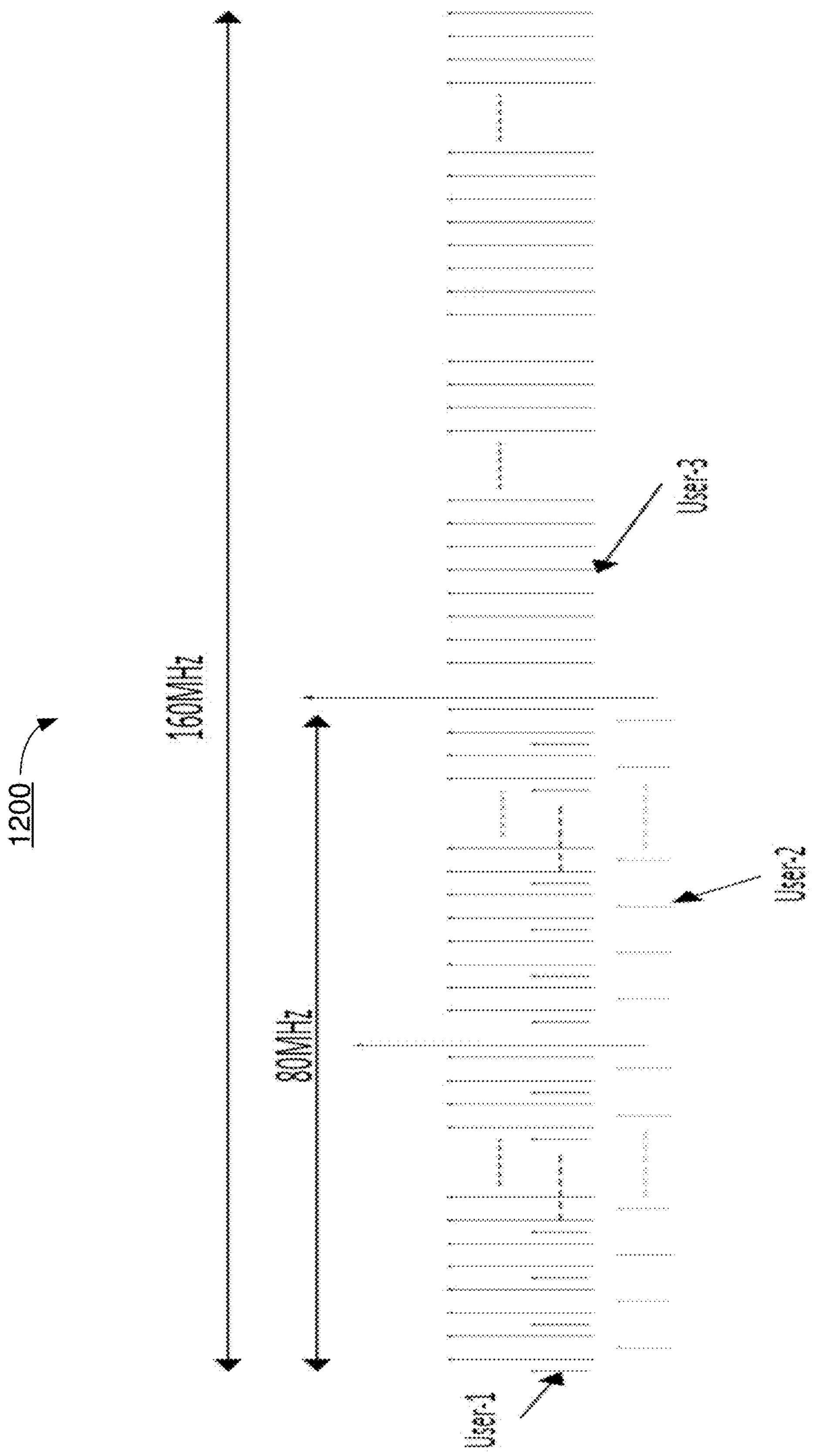
FIG. 12 is a diagram of an example scenario under a proposed scheme in accordance with the present disclosure.

FIG. 12 illustrates an example scenario 1200 under a proposed scheme in accordance with the present disclosure. Scenario 1200 may pertain to a dRU with mixed-distribution bandwidth OFDMA. Referring to FIG. 12, in scenario 1200, there may be multiple users, namely user-1, user-2 and user-3. For instance, user-1 may utilize a dRU242 on a primary 80 MHz frequency subblock (P80), user-2 may utilize another dRU242 on the P80, and user-3 may utilize a dRU996 on a primary 160 MHz frequency subblock (P160).

Figure 13:
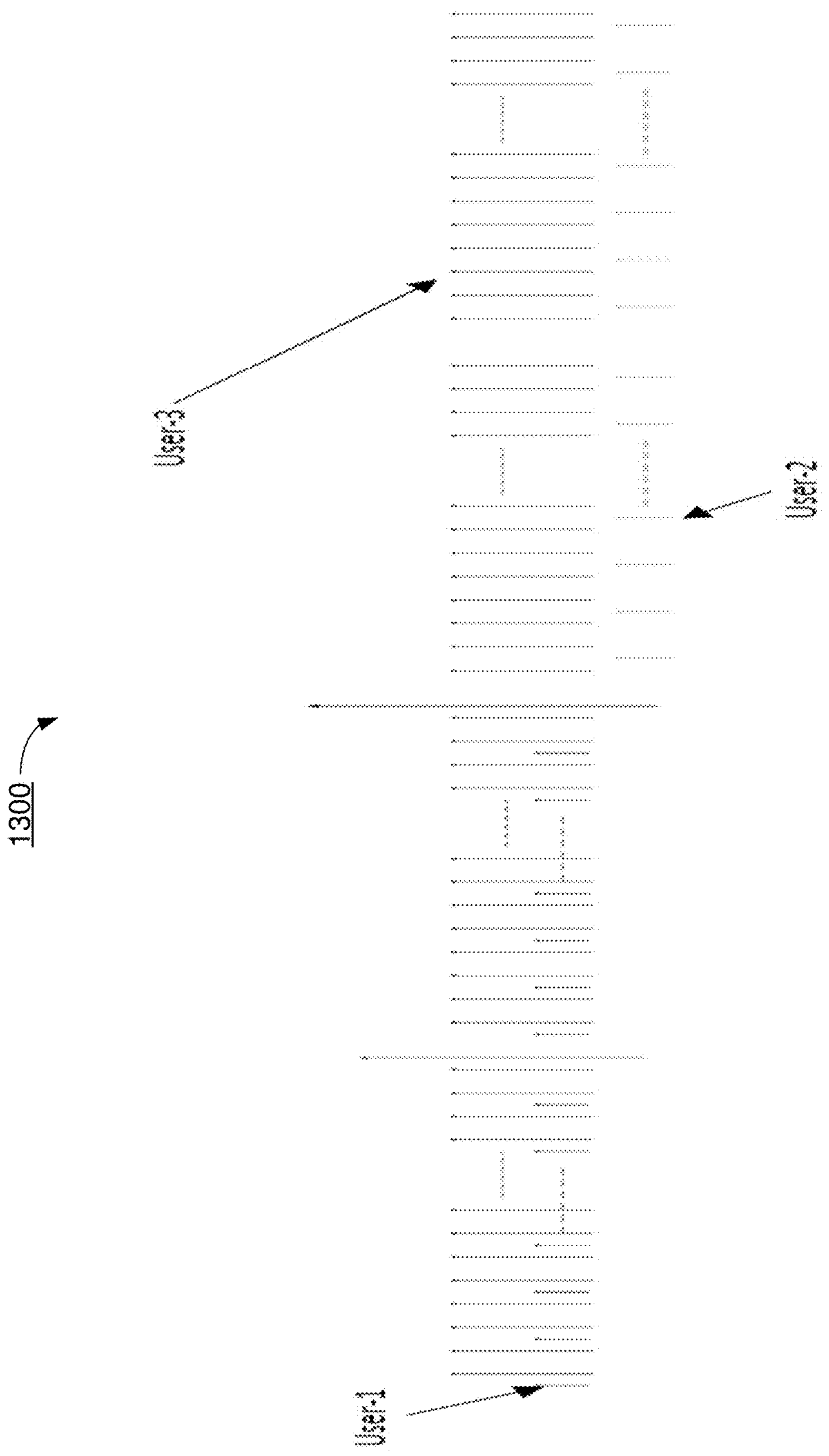
FIG. 13 is a diagram of an example scenario under a proposed scheme in accordance with the present disclosure.

FIG. 13 illustrates an example scenario 1300 under a proposed scheme in accordance with the present disclosure. Scenario 1300 may pertain to a dRU with mixed-distribution bandwidth OFDMA. Referring to FIG. 13, in scenario 1300, there may be multiple users, namely user-1, user-2 and user-3. For instance, user-1 may utilize a dRU242 on a primary 80 MHz frequency subblock (P80), user-2 may utilize another dRU242 on a secondary 80 MHz frequency subblock (S80), and user-3 may utilize a dRU996 on a primary 160 MHz frequency subblock (P160).

Figure 14:
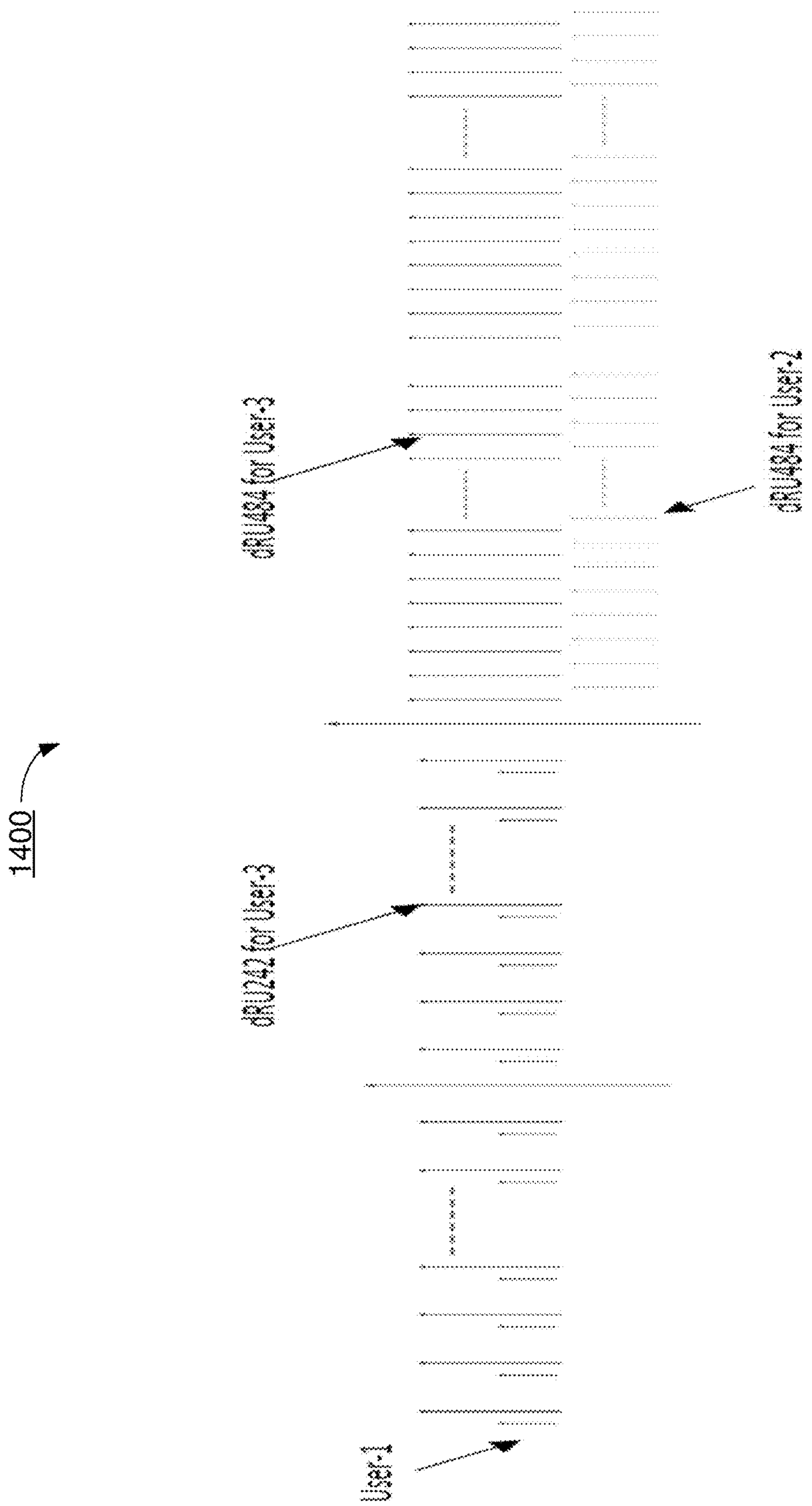
FIG. 14 is a diagram of an example scenario under a proposed scheme in accordance with the present disclosure.

FIG. 14 illustrates an example scenario 1400 under a proposed scheme in accordance with the present disclosure. Scenario 1400 may pertain to a dRU with mixed-distribution bandwidth OFDMA. Referring to FIG. 14, in scenario 1400, there may be multiple users, namely user-1, user-2 and user-3. For instance, user-1 may utilize a dRU242 on a primary 80 MHz frequency subblock (P80), user-2 may utilize another dRU242 on a secondary 80 MHz frequency subblock (S80), and user-3 may utilize a dRU242 on the P80 and a dRU484 on the S80.

Figure 15:
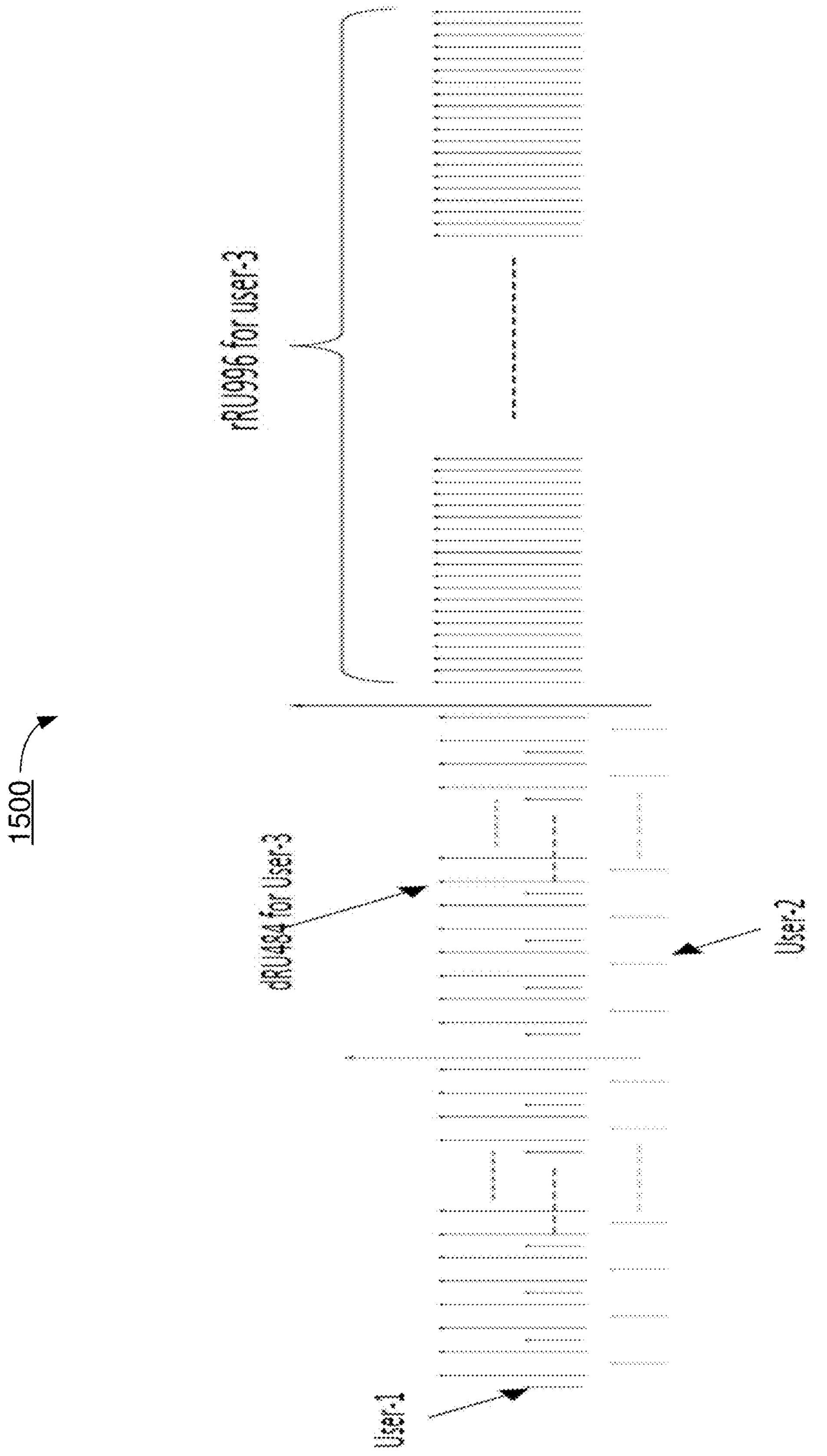
FIG. 15 is a diagram of an example scenario under a proposed scheme in accordance with the present disclosure.

FIG. 15 illustrates an example scenario 1500 under a proposed scheme in accordance with the present disclosure. Scenario 1500 may pertain to a dRU with mixed-distribution bandwidth OFDMA. Referring to FIG. 15, in scenario 1500, there may be multiple users, namely user-1, user-2 and user-3. For instance, user-1 may utilize a dRU242 on a primary 80 MHz frequency subblock (P80), user-2 may utilize another dRU242 on the P80, and user-3 may utilize a dRU484 on the P80 and a rRU996 on the S80 (e.g., as a mixed-MRU mMRU(484+996)=dRU484+rRU996).

Figure 16:
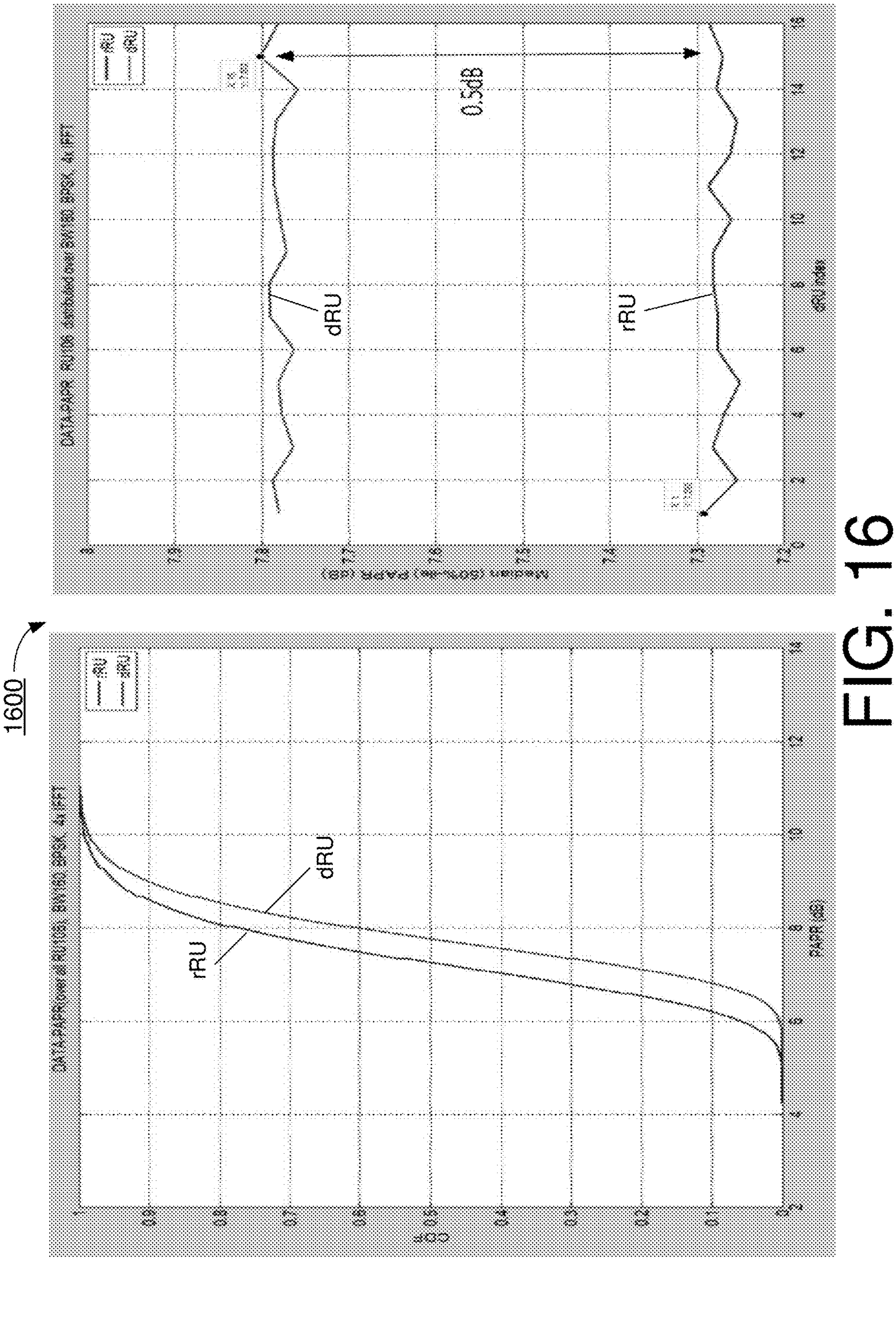
FIG. 16 is a diagram of an example simulation under a proposed scheme in accordance with the present disclosure.
Figure 17:
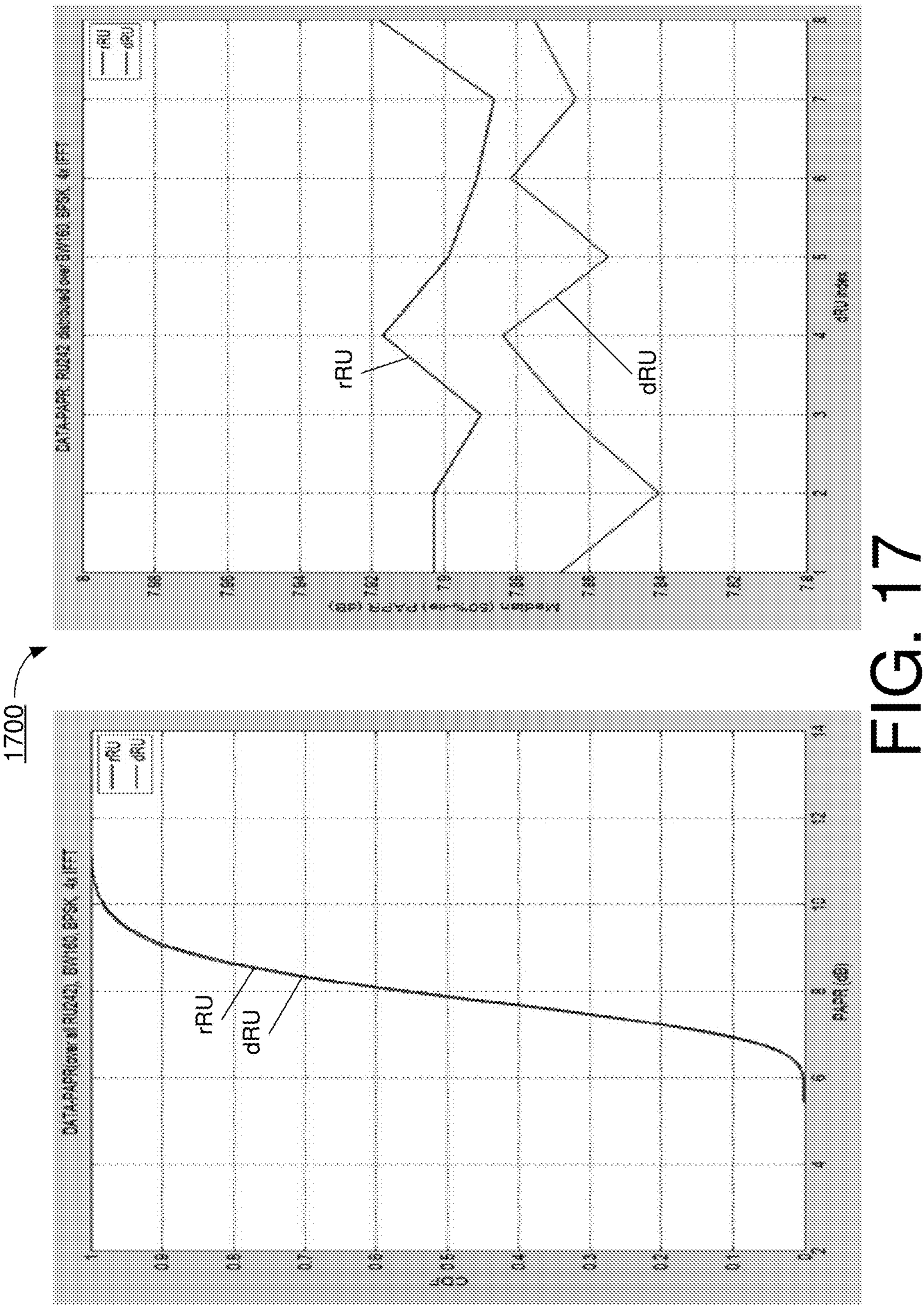
FIG. 17 is a diagram of an example simulation under a proposed scheme in accordance with the present disclosure.
Figure 18:
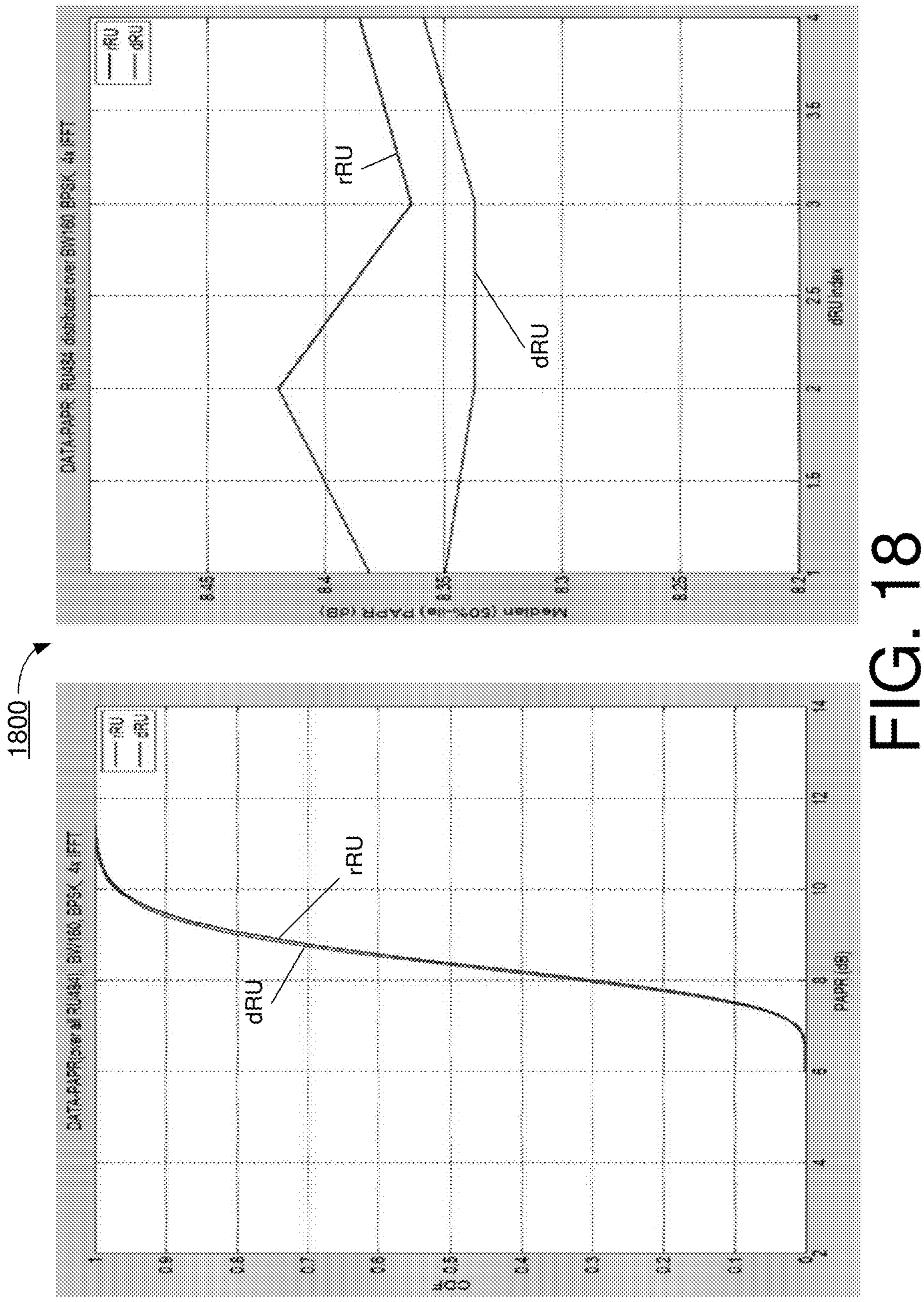
FIG. 18 is a diagram of an example simulation under a proposed scheme in accordance with the present disclosure.
Figure 19:
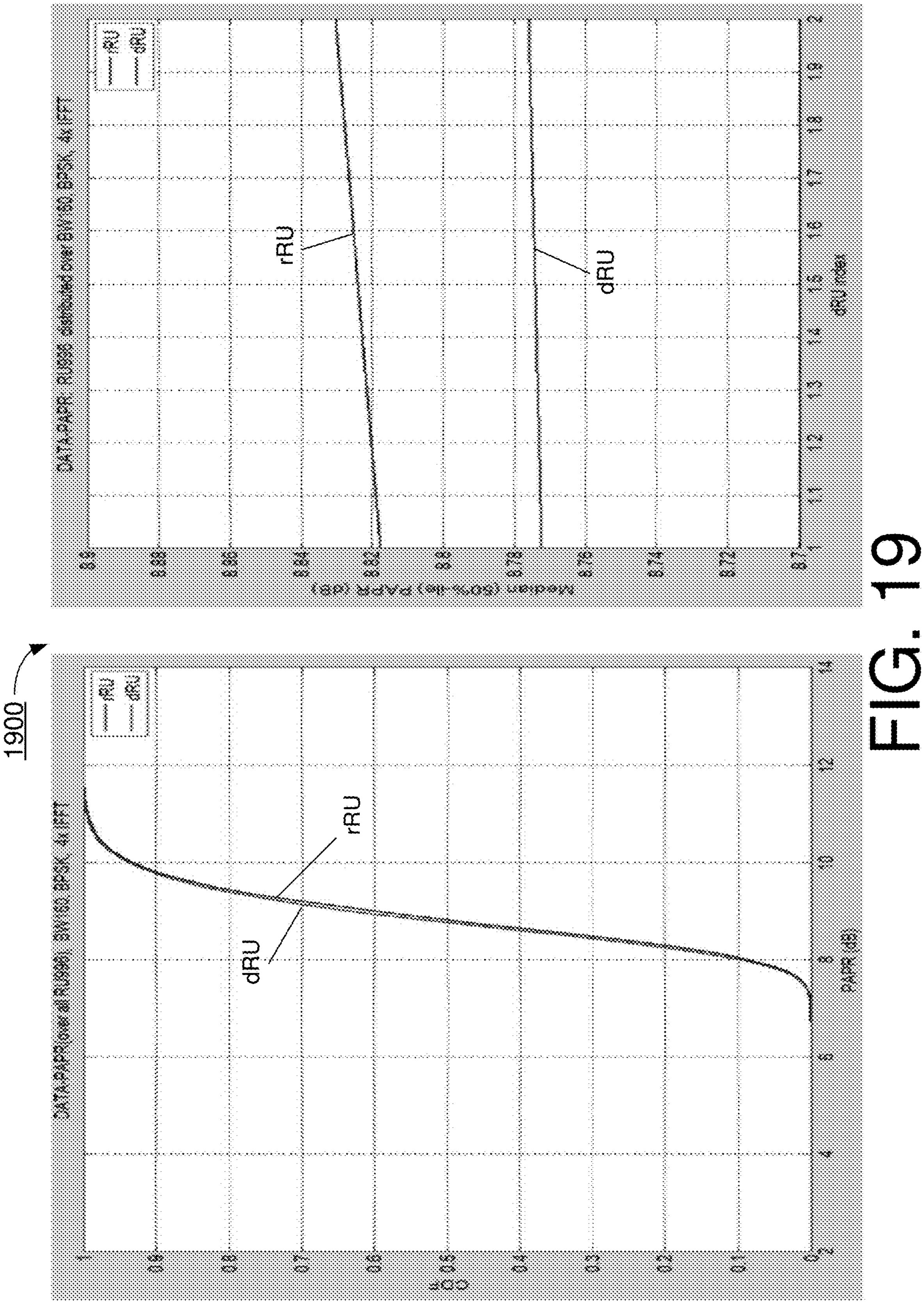
FIG. 19 is a diagram of an example simulation under a proposed scheme in accordance with the present disclosure.

FIG. 16 illustrates an example simulation 1600 of a PAPR performance comparison between a rRU106 and a dRU106 on BW160 under a proposed scheme in accordance with the present disclosure. FIG. 17 illustrates an example simulation 1700 of a PAPR performance comparison between a rRU242 and a dRU242 on BW160 under a proposed scheme in accordance with the present disclosure. FIG. 18 illustrates an example simulation 1800 of a PAPR performance comparison between a rRU484 and a dRU484 on BW160 under a proposed scheme in accordance with the present disclosure. FIG. 19 illustrates an example simulation 1900 of a PAPR performance comparison between a rRU996 and a dRU996 on BW160 under a proposed scheme in accordance with the present disclosure.

Figure 20:
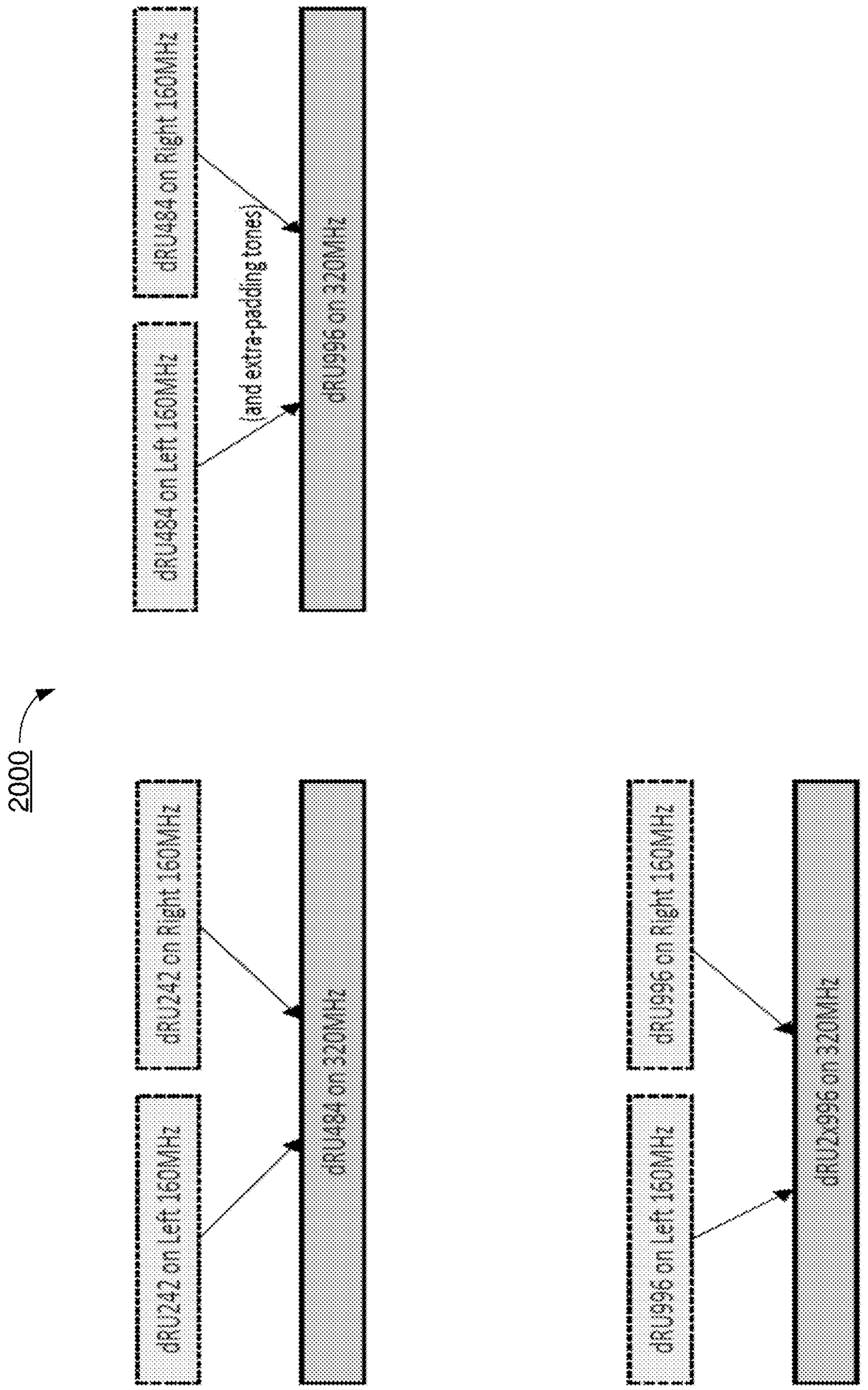
FIG. 20 is a diagram of an example design under a proposed scheme in accordance with the present disclosure.

FIG. 20 illustrates an example design 2000 under a proposed scheme in accordance with the present disclosure. Design 2000 may pertain to the construction of a 320 MHz dRU based on a 160 MHz dRU. Under the proposed scheme, a dRU on BW320 may be constructed by using the 160 MHz dRU tone plan as a basic building block. Referring to FIG. 20, after generating a dRU on BW160 by using a 80 MHz dRU tone plan, a dRU on BW320 may be constructed by using the 160 MHz dRU tone plan as shown in FIG. 20. For instance, a 484-tone dRU on 320 MHz may be built from two 242-tone dRUs on 160 MHz (one on the left and the other on the right), a 996-tone dRU on 320 MHz may be built from two 484-tone dRUs on 160 MHz (one on the left and the other on the right), and a 2×996-tone dRU on 320 MHz may be built from two 996-tone dRUs on 160 MHz (one on the left and the other on the right).

FIG. 21 illustrates an example design 2100 under a proposed scheme in accordance with the present disclosure. Design 2100 may pertain to a table of dRU subcarrier indices for BW320. Under the proposed scheme, data and pilot subcarrier indices for dRUs in a 320 MHz PPDU may be generated according to the table shown in FIG. 21. Referring to FIG. 21, dRU484, dRU996 and dRU(2×996) may be supported in the 320 MHz distribution bandwidth.

Figure 22:
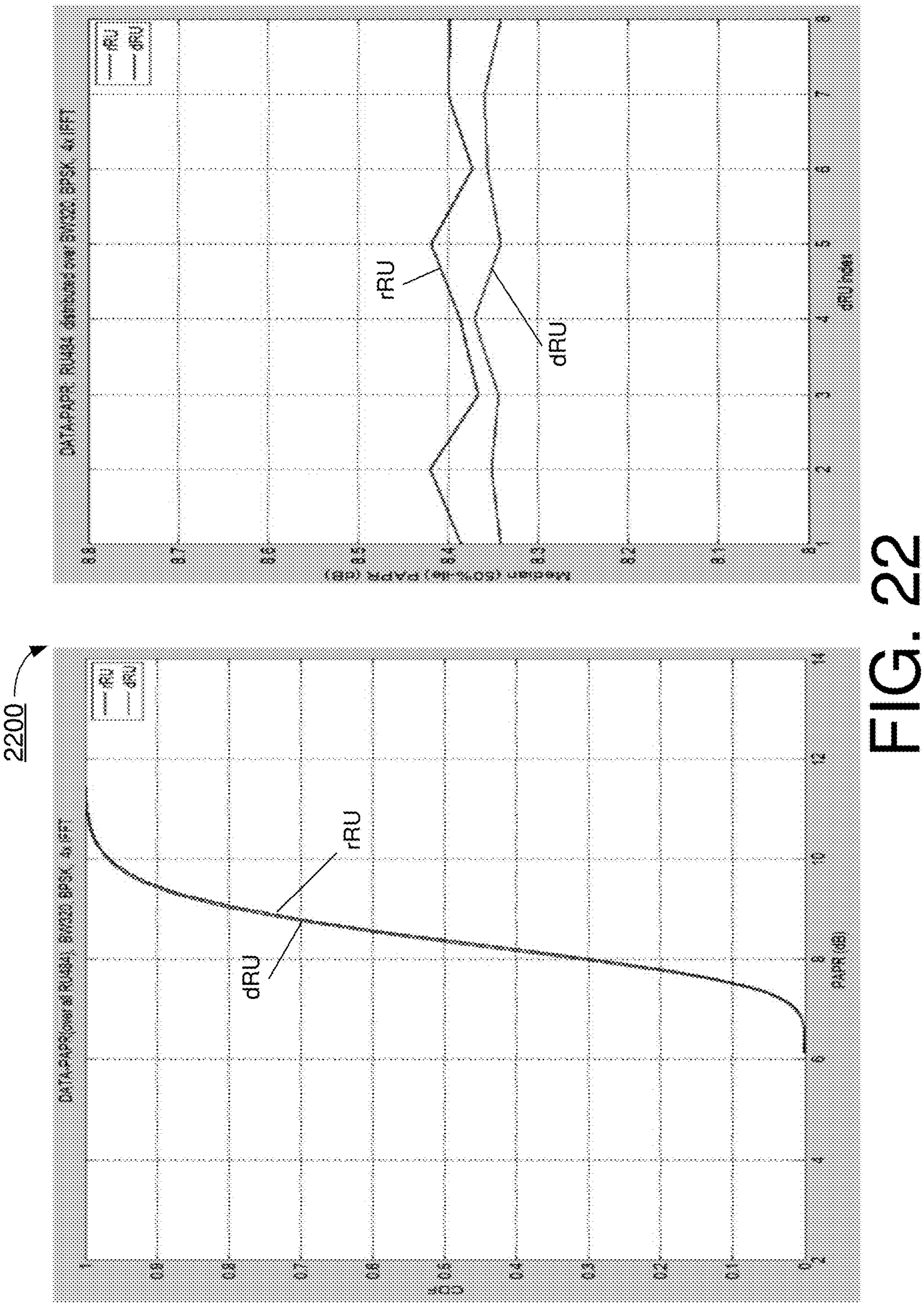
FIG. 22 is a diagram of an example simulation under a proposed scheme in accordance with the present disclosure.
Figure 23:
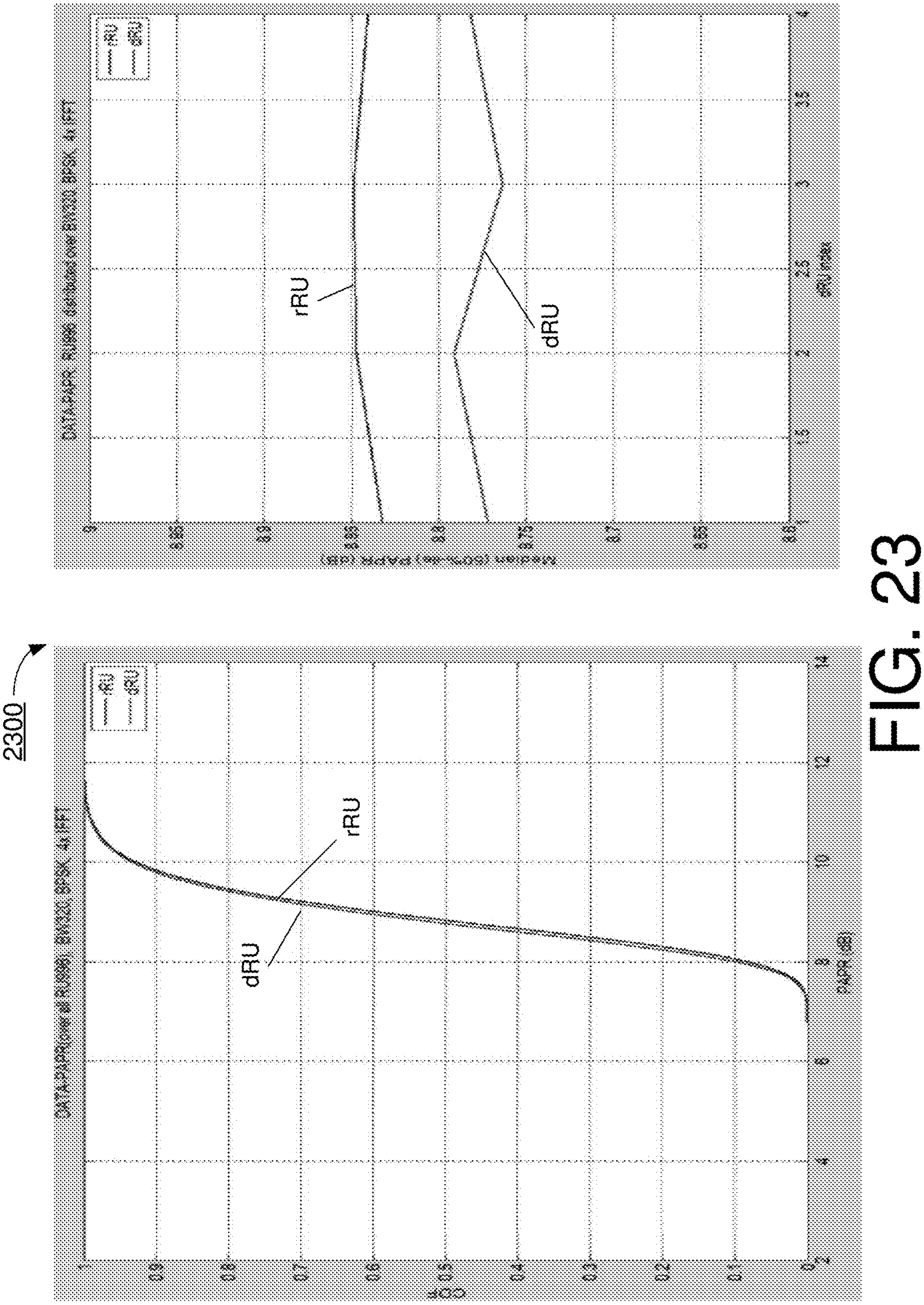
FIG. 23 is a diagram of an example simulation under a proposed scheme in accordance with the present disclosure.
Figure 24:
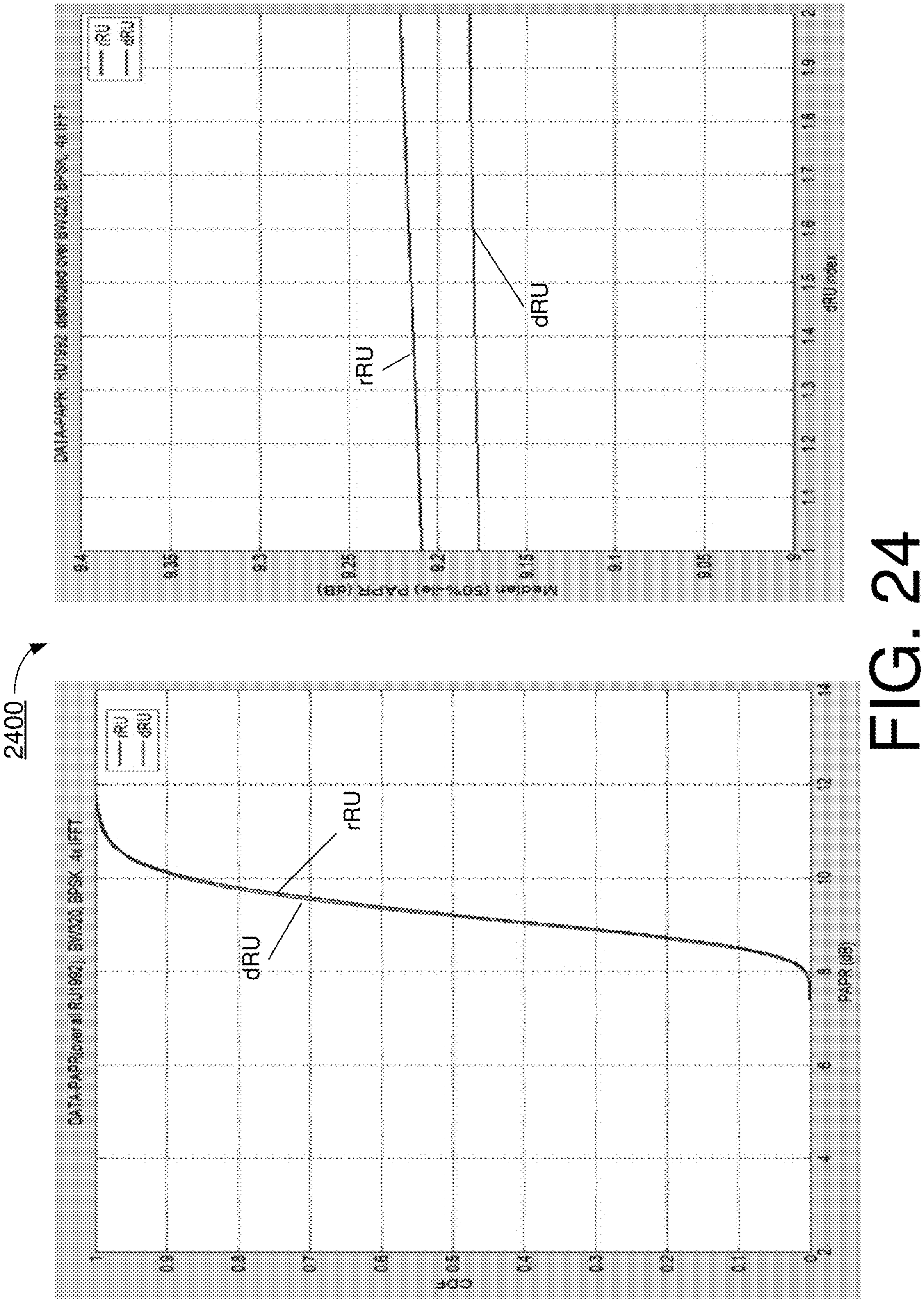
FIG. 24 is a diagram of an example simulation under a proposed scheme in accordance with the present disclosure.

FIG. 22 illustrates an example simulation 2200 of a PAPR performance comparison between a rRU484 and a dRU484 on BW320 under a proposed scheme in accordance with the present disclosure. FIG. 23 illustrates an example simulation 2300 of a PAPR performance comparison between a rRU996 and a dRU996 on BW320 under a proposed scheme in accordance with the present disclosure. FIG. 24 illustrates an example simulation 2400 of a PAPR performance comparison between a rRU(2×996) and a dRU(2×996) on BW320 under a proposed scheme in accordance with the present disclosure.

Figure 25:
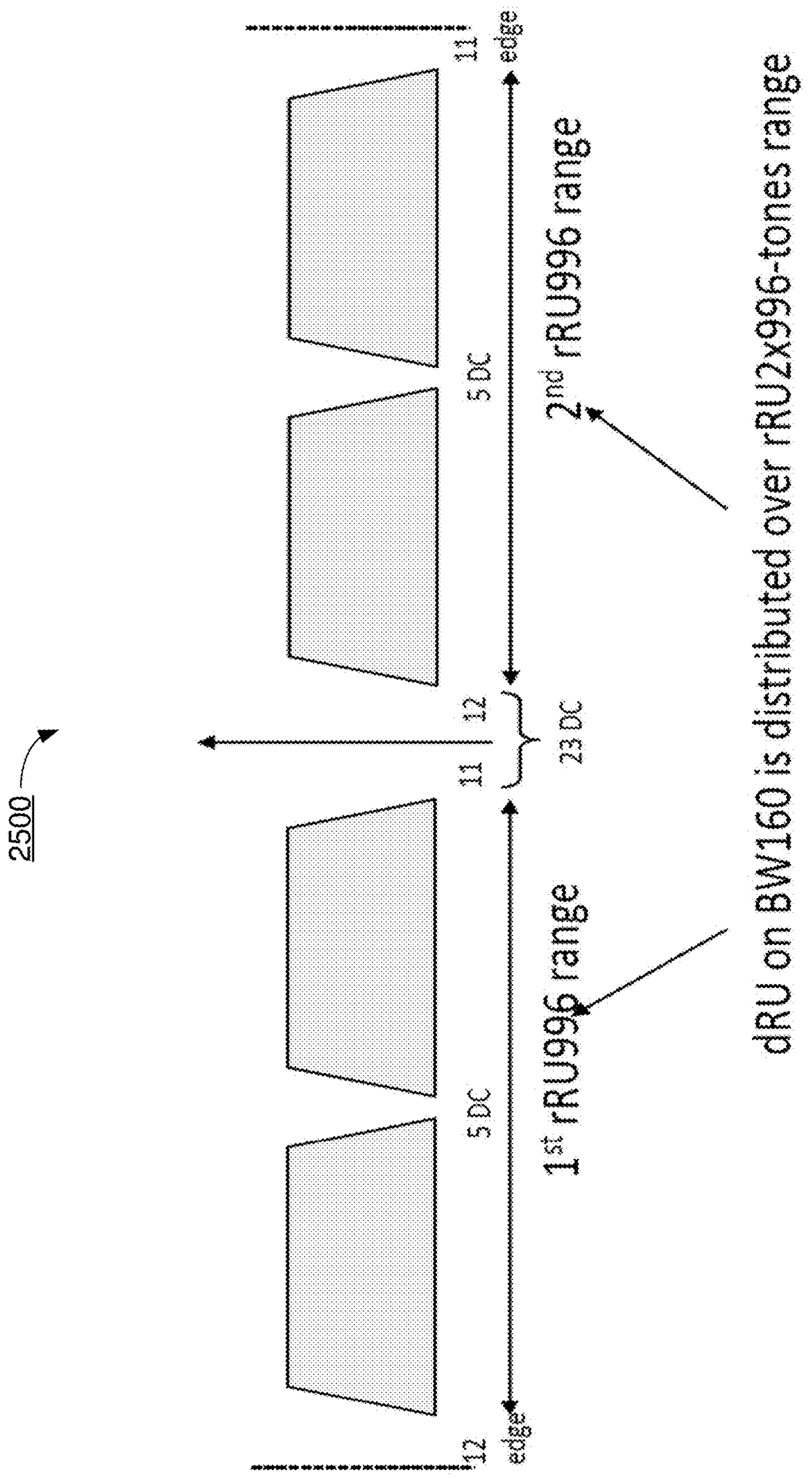
FIG. 25 is a diagram of an example scenario under a proposed scheme in accordance with the present disclosure.

FIG. 25 illustrates an example scenario 2500 under a proposed scheme in accordance with the present disclosure. Scenario 2500 may pertain to a range of dRU tone distribution over a wide bandwidth such as 160 MHz. Referring to FIG. 25, under the proposed scheme, a dRU on BW160 may be distributed over a range of 2×996 tones. Moreover, the dRU on BW160 may be constructed from a dRU on BW80. Furthermore, DC tones and edge tones may be reserved and not used under the proposed scheme.

FIG. 26 illustrates an example design 2600 under a proposed scheme in accordance with the present disclosure. Design 2600 may pertain to a table of dRU tone plan on BW160 derived from or generated using a 80 MHz dRU tone plan. Under the proposed scheme, data and pilot subcarrier indices for dRUs in a 160 MHz PPDU may be generated according to the table shown in FIG. 26. In the table shown in FIG. 26, dRU26 n, dRU52 n, dRU106 n, dRU242 n and dRU484 n are for dRU on BW80. Moreover, in the table, A=[1 2]+2*j, j=0, 1, 2, . . . , 12; B=A+2; C=1:2:26; D=2:2:26; and X={[2 3 4 5]+8*j,106}; Y={1,[6 7 8 9]+8*j}, j=0, 1, 2, . . . , 12.

FIG. 27 illustrates an example design 2700 under a proposed scheme in accordance with the present disclosure. Design 2700 may pertain to a table of dRU tone plan on BW160.

FIG. 28 illustrates an example design 2800 under a proposed scheme in accordance with the present disclosure. Design 2800 may pertain to a table of dRU tone plan on BW160 derived from or generated using a 80 MHz dRU tone plan. Under the proposed scheme, data and pilot subcarrier indices for dRUs in a 160 MHz PPDU may be generated according to the table shown in FIG. 28. In the table shown in FIG. 28, dRU26_n, dRU52_n, dRU106_n, dRU242_n and dRU484_n are for dRU on BW80. Moreover, in the table, A=[1 2]+4*j, j=0, 1, 2, . . . , 12; B=A+2; C=1:2:26; D=2:2:26; and X={[2 3 4 5]+8*j,106}; Y={1,[6 7 8 9]+8*j}, j=0, 1, 2, . . . , 12.

FIG. 29 illustrates an example design 2900 under a proposed scheme in accordance with the present disclosure. Design 2900 may pertain to a table of dRU tone plan on BW160.

FIG. 30 illustrates an example design 3000 under a proposed scheme in accordance with the present disclosure. Design 3000 may pertain to a table of dRU tone plan on BW160 derived from or generated using a 80 MHz dRU tone plan. Under the proposed scheme, data and pilot subcarrier indices for dRUs in a 160 MHz PPDU may be generated according to the table shown in FIG. 30. In the table shown in FIG. 30, dRU26_n, dRU52_n, dRU106_n, dRU242_n and dRU484_n are for dRU on BW80. Moreover, in the table, A=[1 2]+4*j, j=0, 1, 2, . . . , 12; B=A+2; C=1:2:26; D=2:2:26; and X={[2 3 4 5]+8*j, 106}; Y={1,[6 7 8 9]+8*j}, j=0, 1, 2, . . . , 12.

FIG. 31 illustrates an example design 3100 under a proposed scheme in accordance with the present disclosure. Design 3100 may pertain to a dRU26 tone plan on BW160.

FIG. 32 illustrates an example design 3200 under a proposed scheme in accordance with the present disclosure. Design 3200 may pertain to a table of dRU106, dRU242, dRU484 and dRU996 tone plans on BW160.

FIG. 33 illustrates an example design 3300 under a proposed scheme in accordance with the present disclosure. Design 3300 may pertain to an alternative way of representing dRU tone plan on BW160 by using a 80 MHz dRU tone plan. Under the proposed scheme, data and pilot subcarrier indices for dRUs in a 160 MHz PPDU may be generated according to the table shown in FIG. 33. In the table shown in FIG. 33, dRU242 n and dRU484 n are for dRU on BW80. Moreover, in the table, U(1:52)=[1 5 9 15]+18*j, j=0, 1, 2, . . . , 12; U(53)=235; and V(1:52)=[6 10 14 18]±18*j, j=0, 1, 2, . . . , 12; V(53)=240.

FIG. 34 illustrates an example design 3400 under a proposed scheme in accordance with the present disclosure. Design 3400 may pertain to a table of dRU tone plan on BW160. It is noteworthy that the dRU tone indices shown in FIG. 34 are the same as those shown in FIG. 33 as they are different ways of representing the tone plan table.

Illustrative Implementations

Figure 35:
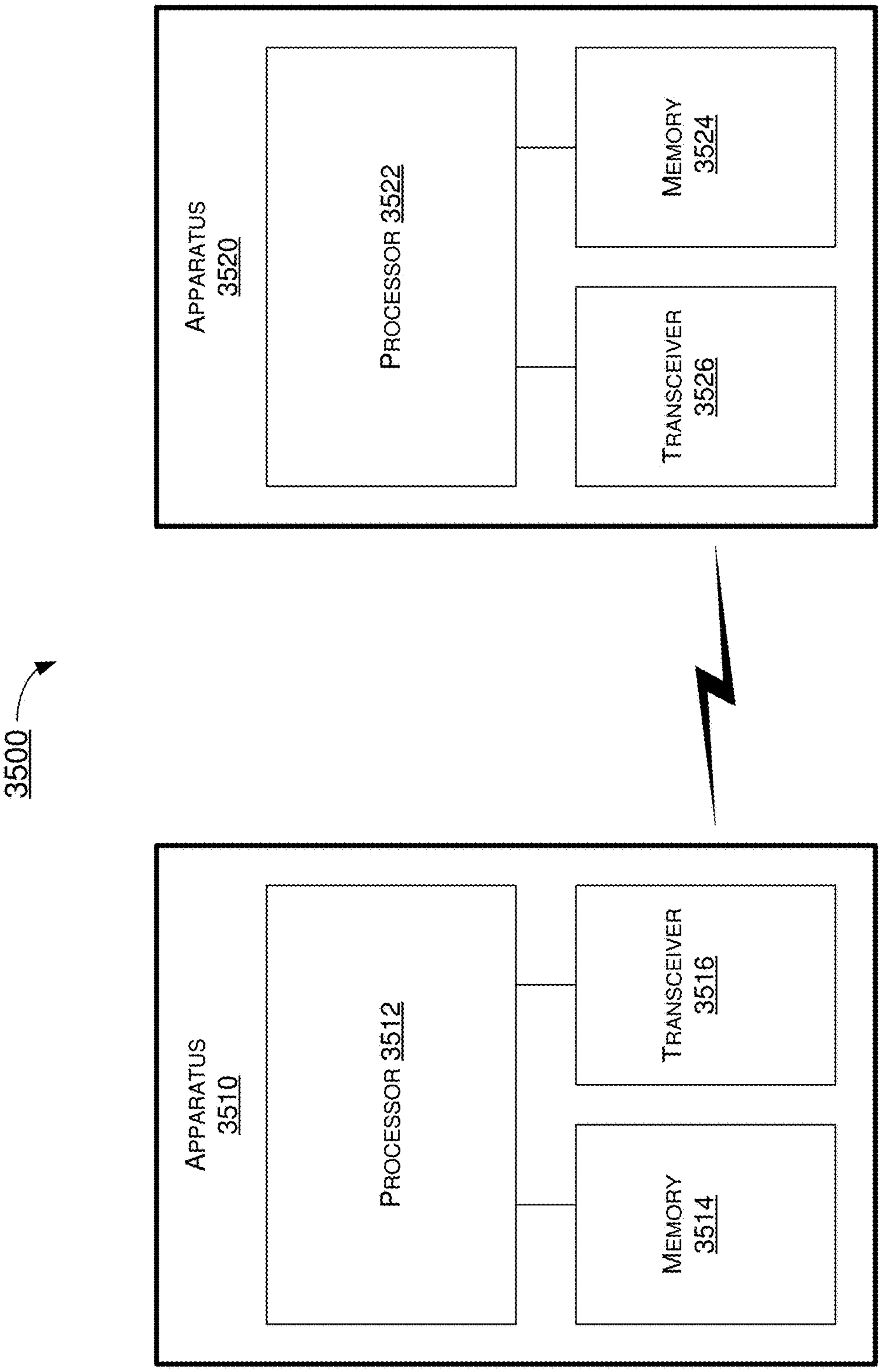
FIG. 35 is a block diagram of an example communication system in accordance with an implementation of the present disclosure.

FIG. 35 illustrates an example system 3500 having at least an example apparatus 3510 and an example apparatus 3520 in accordance with an implementation of the present disclosure. Each of apparatus 3510 and apparatus 3520 may perform various functions to implement schemes, techniques, processes and methods described herein pertaining to 80 MHz dRU tone plan-based dRU designs for wide distribution bandwidths 160 MHz and 320 MHz in wireless communications, including the various schemes described above with respect to various proposed designs, concepts, schemes, systems and methods described above as well as processes described below. For instance, apparatus 3510 may be implemented in STA 110 and apparatus 3520 may be implemented in STA 120, or vice versa.

Each of apparatus 3510 and apparatus 3520 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 3510 and apparatus 3520 may be implemented in a smartphone, a smart watch, a personal digital assistant, a digital camera, or a computing equipment such as a tablet computer, a laptop computer or a notebook computer. Each of apparatus 3510 and apparatus 3520 may also be a part of a machine type apparatus, which may be an IoT apparatus such as an immobile or a stationary apparatus, a home apparatus, a wire communication apparatus or a computing apparatus. For instance, each of apparatus 3510 and apparatus 3520 may be implemented in a smart thermostat, a smart fridge, a smart door lock, a wireless speaker or a home control center. When implemented in or as a network apparatus, apparatus 3510 and/or apparatus 3520 may be implemented in a network node, such as an AP in a WLAN.

In some implementations, each of apparatus 3510 and apparatus 3520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3510 and apparatus 3520 may be implemented in or as a STA or an AP. Each of apparatus 3510 and apparatus 3520 may include at least some of those components shown in FIG. 35 such as a processor 3512 and a processor 3522, respectively, for example. Each of apparatus 3510 and apparatus 3520 may further include one or more other components not pertinent to the proposed scheme of the present disclosure (e.g., internal power supply, display device and/or user interface device), and, thus, such component(s) of apparatus 3510 and apparatus 3520 are neither shown in FIG. 35 nor described below in the interest of simplicity and brevity.

In one aspect, each of processor 3512 and processor 3522 may be implemented in the form of one or more single-core processors, one or more multi-core processors, one or more RISC processors or one or more CISC processors. That is, even though a singular term "a processor" is used herein to refer to processor 3512 and processor 3522, each of processor 3512 and processor 3522 may include multiple processors in some implementations and a single processor in other implementations in accordance with the present disclosure. In another aspect, each of processor 3512 and processor 3522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3512 and processor 3522 is a special-purpose machine specifically designed, arranged and configured to perform specific tasks including those pertaining to 80 MHz dRU tone plan-based dRU designs for wide distribution bandwidths 160 MHz and 320 MHz in wireless communications in accordance with various implementations of the present disclosure.

In some implementations, apparatus 3510 may also include a transceiver 3516 coupled to processor 3512. Transceiver 3516 may include a transmitter capable of wirelessly transmitting and a receiver capable of wirelessly receiving data. In some implementations, apparatus 3520 may also include a transceiver 3526 coupled to processor 3522. Transceiver 3526 may include a transmitter capable of wirelessly transmitting and a receiver capable of wirelessly receiving data. It is noteworthy that, although transceiver 3516 and transceiver 3526 are illustrated as being external to and separate from processor 3512 and processor 3522, respectively, in some implementations, transceiver 3516 may be an integral part of processor 3512 as a system on chip (SoC), and transceiver 3526 may be an integral part of processor 3522 as a SoC.

In some implementations, apparatus 3510 may further include a memory 3514 coupled to processor 3512 and capable of being accessed by processor 3512 and storing data therein. In some implementations, apparatus 3520 may further include a memory 3524 coupled to processor 3522 and capable of being accessed by processor 3522 and storing data therein. Each of memory 3514 and memory 3524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3514 and memory 3524 may include a type of read-only memory (ROM) such as mask ROM, programmable ROM (PROM), erasable programmable ROM (EPROM) and/or electrically erasable programmable ROM (EEPROM). Alternatively, or additionally, each of memory 3514 and memory 3524 may include a type of non-volatile random-access memory (NVRAM) such as flash memory, solid-state memory, ferroelectric RAM (FeRAM), magnetoresistive RAM (MRAM) and/or phase-change memory.

Each of apparatus 3510 and apparatus 3520 may be a communication entity capable of communicating with each other using various proposed schemes in accordance with the present disclosure. For illustrative purposes and without limitation, a description of capabilities of apparatus 3510, as STA 110, and apparatus 3520, as STA 120, is provided below in the context of example process 3600. It is noteworthy that, although a detailed description of capabilities, functionalities and/or technical features of apparatus 3520 is provided below, the same may be applied to apparatus 3510 although a detailed description thereof is not provided solely in the interest of brevity. It is also noteworthy that, although the example implementations described below are provided in the context of WLAN, the same may be implemented in other types of networks.

Illustrative Processes

Figure 36:
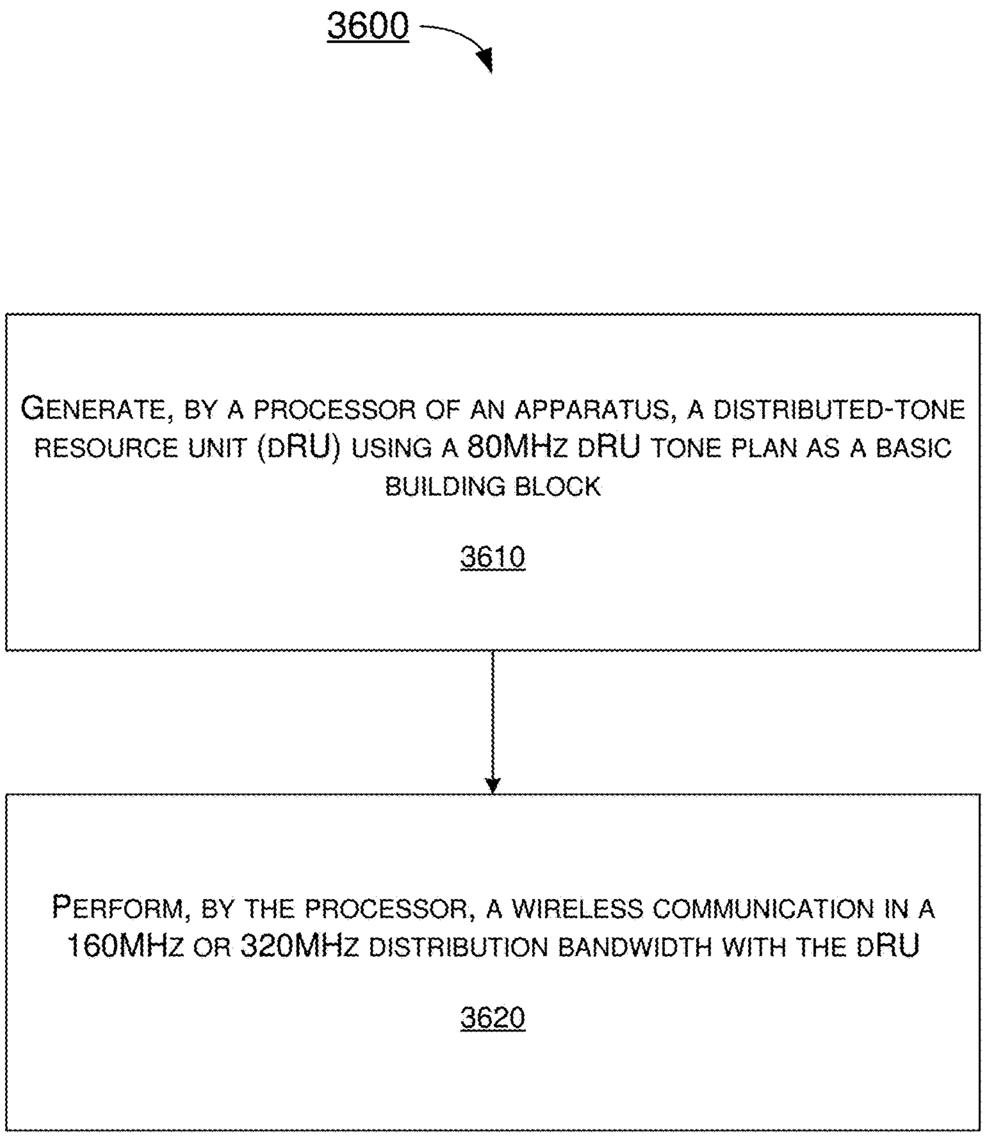
FIG. 36 is a flowchart of an example process in accordance with an implementation of the present disclosure.

FIG. 36 illustrates an example process 3600 in accordance with an implementation of the present disclosure. Process 3600 may represent an aspect of implementing various proposed designs, concepts, schemes, systems and methods described above. More specifically, process 3600 may represent an aspect of the proposed concepts and schemes pertaining to 80 MHz dRU tone plan-based dRU designs for wide distribution bandwidths 160 MHz and 320 MHz in wireless communications in accordance with the present disclosure. Process 3600 may include one or more operations, actions, or functions as illustrated by one or more of blocks 3610 and 3620. Although illustrated as discrete blocks, various blocks of process 3600 may be divided into additional blocks, combined into fewer blocks, or eliminated, depending on the desired implementation. Moreover, the blocks/sub-blocks of process 3600 may be executed in the order shown in FIG. 36 or, alternatively, in a different order. Furthermore, one or more of the blocks/sub-blocks of process 3600 may be executed repeatedly or iteratively. Process 3600 may be implemented by or in apparatus 3510 and apparatus 3520 as well as any variations thereof. Solely for illustrative purposes and without limiting the scope, process 3600 is described below in the context of apparatus 3510 implemented in or as STA 110 functioning as a non-AP STA and apparatus 3520 implemented in or as STA 120 functioning as an AP STA of a wireless network such as a WLAN in network environment 100 in accordance with one or more of IEEE 802.11 standards. Process 3600 may begin at block 3610.

At 3610, process 3600 may involve processor 3512 of apparatus 3510 generating a dRU using a 80 MHz dRU tone plan as a basic building block. Process 3600 may proceed from 3610 to 3620.

At 3620, process 3600 may involve processor 3512 performing, via transceiver 3516, a wireless communication in a 160 MHz or 320 MHz distribution bandwidth with the dRU.

In some implementations, in performing the wireless communication, process 3600 may involve processor 3512 performing the wireless communication in the 160 MHz distribution bandwidth. In such cases, the dRU may include a 106-tone dRU, a 242-tone dRU, a 484-tone dRU or a 996-tone dRU. Moreover, the 106-tone dRU may be built from corresponding two 52-tone dRUs of the 80 MHz dRU tone plan and two extra tones; the 242-tone dRU may be built from corresponding two 106-tone dRUs and one 26-tone dRU of the 80 MHz dRU tone plan and four extra tones; the 484-tone dRU may be built from corresponding two 242-tone dRUs of the 80 MHz dRU tone plan; and the 996-tone dRU may be built from corresponding two 484-tone dRUs of the 80 MHz dRU tone plan and twenty-eight extra tones.

In some implementations, the dRU may include the 106-tone dRU. In such cases, a tone plan for the 106-tone dRU on the 160 MHz distribution bandwidth may include the following (e.g., as shown in FIG. 34): a first dRU (dRU1)=[−1011:72:−579,−475:72:−43,69:72:429,533:72:965], [−995:72:−563,−459:72:−99,13:72:445,549:72:981], [−979:72:−547,−443:72:−83,29:72:461,565:72:925], [−955:72:−595,−491:72:− 59,45:72:477,581:72:941]; a second dRU (dRU2)=dRU1+8; a third dRU (dRU3)=[−991:72:−559,−455:72:−23,81:72:441,545:72:977], [−975:72:−543,−439:72:−79,33:72:465,569:72:1001], [−959:72:−599,−495:72:−63,49:72:481,585:72:945], [−943:72:−583,−479:72:−47,65:72:425,529:72:961]; a fourth dRU (dRU4)=dRU3+8; a fifth dRU (dRU5)=dRU1+2; a sixth dRU (dRU6)=dRU1+10; a seventh dRU (dRU7)=dRU3+2; an eighth dRU (dRU8)=dRU 3+10; a nineth dRU (dRU9)=dRU1+1; a tenth dRU (dRU10)=dRU1+9; an eleventh dRU (dRU11)=dRU3+1; a twelve dRU (dRU12)=dRU3+9; a thirteenth dRU (dRU13)=dRU1+3; a fourteenth dRU (dRU14)=dRU1+11; a fifteenth dRU (dRU15)=dRU3+3; and a sixteenth dRU (dRU16)=dRU3+11.

In some implementations, the dRU may include the 242-tone dRU. In such cases, a tone plan for the 242-tone dRU on the 160 MHz distribution bandwidth may include the following (e.g., as shown in FIG. 34): a first dRU (dRU1)=[−1011:8:−531,−491:8:−19,13:8:493,533:8:1005]; a second dRU (dRU2)=[−1007:8:−535,−495:8:−15,17:8:489,529:8:1009]; a third dRU (dRU3)=dRU1+2; a fourth dRU (dRU4)=dRU2+2; a fifth dRU (dRU5)=dRU1+1; a sixth dRU (dRU6)=dRU2+1; a seventh dRU (dRU7)=dRU1+3; and an eighth dRU (dRU8)=dRU2+3.

In some implementations, the dRU may include the 484-tone dRU. In such cases, a tone plan for the 484-tone dRU on the 160 MHz distribution bandwidth may include the following (e.g., as shown in FIG. 34): a first dRU (dRU1)=[−1011:4:−531,−495:4:−15,13:4:493,529:4:1009]; a second dRU (dRU2)=dRU1+2; a third dRU (dRU3)=dRU1+1; and a fourth dRU (dRU4)=dRU1+3.

In some implementations, the dRU may include the 996-tone dRU. In such cases, a tone plan for the 996-tone dRU on the 160 MHz distribution bandwidth may include the following (e.g., as shown in FIG. 34): a first dRU (dRU1)=[−1011:2:−515,− 509:2:−13,13:2:509,515:2:1011]; and a second dRU (dRU2)=[−1012:2:−516,−508:2:−12,12:2:508,516:2:1012].

In some implementations, in performing the wireless communication, process 3600 may involve processor 3512 performing the wireless communication in the 320 MHz distribution bandwidth. In such cases, the dRU may include a 484-tone dRU, a 996-tone dRU or a 2×996-tone dRU. Moreover, the 484-tone dRU may be built from corresponding two 242-tone dRUs generated on the 160 MHz distribution bandwidth using the 80 MHz dRU tone plan; the 996-tone dRU may be built from corresponding two 484-tone dRUs generated on the 160 MHz distribution bandwidth using the 80 MHz dRU tone plan; and the 2×996-tone dRU may be built from corresponding two 996-tone dRUs generated on the 160 MHz distribution bandwidth using the 80 MHz dRU tone plan.

In some implementations, in generating the dRU, process 3600 may involve processor 3512 generating two or more dRUs of a same size or different sizes. Moreover, in performing the wireless communication, process 3600 may involve processor 3512 performing a mixed-distribution bandwidth operation in different frequency subblocks or segments using the two or more dRUs with different distribution bandwidths.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a distributed-tone resource unit (dRU) using a 80 MHz dRU tone plan as a basic building block; and performing, by the processor, a wireless communication in a 160 MHz or 320 MHz distribution bandwidth with the dRU, wherein the performing of the wireless communication comprises performing the wireless communication in the 160 MHz distribution bandwidth, and wherein the dRU comprises a 106-tone dRU, a 242-tone dRU, a 484-tone dRU or a 996-tone dRU, wherein, in an event that the dRU comprises the 106-tone dRU, a tone plan for the 106-tone dRU on the 160 MHz distribution bandwidth comprises:

a first dRU (dRU1)=
[−1011:72:−579,−475:72:−43,69:72:429,533:72:965]
[−995:72:−563,−459:72:−99,13:72:445,549:72:981]
[−979:72:−547,−443:72:−83,29:72:461,565:72:925]
[−955:72:−595,−491:72:−59,45:72:477,581:72:941];
a second dRU (dRU2)=dRU1+8;
a third dRU (dRU3)=
[−991:72:−559,−455:72:−23,81:72:441,545:72:977]
[−975:72:−543,−439:72:−79,33:72:465,569:72:1001]
[−959:72:−599,−495:72:−63,49:72:481,585:72:945]
[−943:72:−583,−479:72:−47,65:72:425,529:72:961];
a fourth dRU (dRU4)=dRU3+8;
a fifth dRU (dRU5)=dRU1+2;
a sixth dRU (dRU6)=dRU1+10;
a seventh dRU (dRU7)=dRU3+2;
an eighth dRU (dRU8)=dRU 3+10;
a nineth dRU (dRU9)=dRU1+1;
a tenth dRU (dRU10)=dRU1+9;
an eleventh dRU (dRU11)=dRU3+1;
a twelve dRU (dRU12)=dRU3+9;
a thirteenth dRU (dRU13)=dRU1+3;
a fourteenth dRU (dRU14)=dRU1+11;
a fifteenth dRU (dRU15)=dRU3+3; and
a sixteenth dRU (dRU16)=dRU3+11, wherein, in an event that the dRU comprises the 242-tone dRU, a tone plan for the 242-tone dRU on the 160 MHz distribution bandwidth comprises:
a first dRU (dRU1)=[−1011:8:−531,−491:8:−19,13:8:493,533:8:1005];
a second dRU (dRU2)=[−1007:8:−535,−495:8:−15,17:8:489,529:8:1009];
a third dRU (dRU3)=dRU1+2;
a fourth dRU (dRU4)=dRU2+2;
a fifth dRU (dRU5)=dRU1+1;
a sixth dRU (dRU6)=dRU2+1;
a seventh dRU (dRU7)=dRU1+3; and
an eighth dRU (dRU8)=dRU2+3, wherein, in an event that the dRU comprises the 484-tone dRU, a tone plan for the 484-tone dRU on the 160 MHz distribution bandwidth comprises:
a first dRU (dRU1)=[−1011:4:−531,−495:4:−15,13:4:493,529:4:1009];
a second dRU (dRU2)=dRU1+2;
a third dRU (dRU3)=dRU1+1; and
a fourth dRU (dRU4)=dRU1+3, and wherein, in an event that the dRU comprises the 996-tone dRU, a tone plan for the 996-tone dRU on the 160 MHz distribution bandwidth comprises:
a first dRU (dRU1)=[−1011:2:−515,−509:2:−13,13:2:509,515:2:1011]; and
a second dRU (dRU2)=[−1012:2:−516,−508:2:−12,12:2:508,516:2:1012].

2. The method of claim 1, wherein:
the 106-tone dRU is built from corresponding two 52-tone dRUs of the 80 MHz dRU tone plan and two extra tones;
the 242-tone dRU is built from corresponding two 106-tone dRUs and one 26-tone dRU of the 80 MHz dRU tone plan and four extra tones;
the 484-tone dRU is built from corresponding two 242-tone dRUs of the 80 MHz dRU tone plan; and
the 996-tone dRU is built from corresponding two 484-tone dRUs of the 80 MHz dRU tone plan and twenty-eight extra tones.

3. The method of claim 1, wherein the performing of the wireless communication comprises performing the wireless communication in the 320 MHz distribution bandwidth, and wherein the dRU comprises a 484-tone dRU, a 996-tone dRU or a 2×996-tone dRU.

4. The method of claim 3, wherein:
the 484-tone dRU is built from corresponding two 242-tone dRUs generated on the 160 MHz distribution bandwidth using the 80 MHz dRU tone plan;
the 996-tone dRU is built from corresponding two 484-tone dRUs generated on the 160 MHz distribution bandwidth using the 80 MHz dRU tone plan; and
the 2×996-tone dRU is built from corresponding two 996-tone dRUs generated on the 160 MHz distribution bandwidth using the 80 MHz dRU tone plan.

5. The method of claim 1, wherein the generating of the dRU comprises generating two or more dRUs of a same size or different sizes, and wherein the performing of the wireless communication comprises performing a mixed-distribution bandwidth operation in different frequency subblocks or segments using the two or more dRUs with different distribution bandwidths.

6. An apparatus, comprising:
a transceiver configured to communicate wirelessly; and
a processor coupled to the transceiver and configured to perform operations comprising:
generating a distributed-tone resource unit (dRU) using a 80 MHz dRU tone plan as a basic building block; and
performing, via the transceiver, a wireless communication in a 160 MHz or 320 MHz distribution bandwidth with the dRU,
wherein the performing of the wireless communication comprises performing the wireless communication in the 160 MHz distribution bandwidth, and wherein the dRU comprises a 106-tone dRU, a 242-tone dRU, a 484-tone dRU or a 996-tone dRU,
wherein, in an event that the dRU comprises the 106-tone dRU, a tone plan for the 106-tone dRU on the 160 MHz distribution bandwidth comprises:
a first dRU (dRU1)=
[−1011:72:−579,−475:72:−43,69:72:429,533:72:965]
[−995:72:−563,−459:72:−99,13:72:445,549:72:981]
[−979:72:−547,−443:72:−83,29:72:461,565:72:925]
[−955:72:−595,−491:72:−59,45:72:477,581:72:941];
a second dRU (dRU2)=dRU1+8;
a third dRU (dRU3)=
[−991:72:−559,−455:72:−23,81:72:441,545:72:977]
[−975:72:−543,−439:72:−79,33:72:465,569:72:1001]
[−959:72:−599,−495:72:−63,49:72:481,585:72:945]
[−943:72:−583,−479:72:−47,65:72:425,529:72:961];
a fourth dRU (dRU4)=dRU3+8;
a fifth dRU (dRU5)=dRU1+2;
a sixth dRU (dRU6)=dRU1+10;
a seventh dRU (dRU7)=dRU3+2;
an eighth dRU (dRU8)=dRU 3+10;
a nineth dRU (dRU9)=dRU1+1;
a tenth dRU (dRU10)=dRU1+9;
an eleventh dRU (dRU11)=dRU3+1;
a twelve dRU (dRU12)=dRU3+9;

a thirteenth dRU (dRU13)=dRU1+3;

a fourteenth dRU (dRU14)=dRU1+11;

a fifteenth dRU (dRU15)=dRU3+3; and a sixteenth dRU (dRU16)=dRU3+11, wherein, in an event that the dRU comprises the 242-tone dRU, a tone plan for the 242-tone dRU on the 160 MHz distribution bandwidth comprises:

a first dRU (dRU1)=[−1011:8:−531,−491:8:−19,13:8:493,533:8:1005];

a second dRU (dRU2)=[−1007:8:−535,−495:8:−15,17:8:489,529:8:1009];

a third dRU (dRU3)=dRU1+2;

a fourth dRU (dRU4)=dRU2+2;

a fifth dRU (dRU5)=dRU1+1;

a sixth dRU (dRU6)=dRU2+1;

a seventh dRU (dRU7)=dRU1+3; and an eighth dRU (dRU8)=dRU2+3, wherein, in an event that the dRU comprises the 484-tone dRU, a tone plan for the 484-tone dRU on the 160 MHz distribution bandwidth comprises:

a first dRU (dRU1)=[−1011:4:−531,−495:4:−15,13:4:493,529:4:1009];

a second dRU (dRU2)=dRU1+2;

a third dRU (dRU3)=dRU1+1; and a fourth dRU (dRU4)=dRU1+3, and wherein, in an event that the dRU comprises the 996-tone dRU, a tone plan for the 996-tone dRU on the 160 MHz distribution bandwidth comprises:

a first dRU (dRU1)=[−1011:2:−515,−509:2:−13,13:2:509,515:2:1011]; and a second dRU (dRU2)=[−1012:2:−516,−508:2:−12,12:2:508,516:2:1012].

7. The apparatus of claim 6, wherein:

the 106-tone dRU is built from corresponding two 52-tone dRUs of the 80 MHz dRU tone plan and two extra tones;

the 242-tone dRU is built from corresponding two 106-tone dRUs and one 26-tone dRU of the 80 MHz dRU tone plan and four extra tones;

the 484-tone dRU is built from corresponding two 242-tone dRUs of the 80 MHz dRU tone plan; and the 996-tone dRU is built from corresponding two 484-tone dRUs of the 80 MHz dRU tone plan and twenty-eight extra tones.

8. The apparatus of claim 6, wherein the performing of the wireless communication comprises performing the wireless communication in the 320 MHz distribution bandwidth, and wherein the dRU comprises a 484-tone dRU, a 996-tone dRU or a 2×996-tone dRU.

9. The apparatus of claim 8, wherein:

the 484-tone dRU is built from corresponding two 242-tone dRUs generated on the 160 MHz distribution bandwidth using the 80 MHz dRU tone plan;

the 996-tone dRU is built from corresponding two 484-tone dRUs generated on the 160 MHz distribution bandwidth using the 80 MHz dRU tone plan; and the 2×996-tone dRU is built from corresponding two 996-tone dRUs generated on the 160 MHz distribution bandwidth using the 80 MHz dRU tone plan.

10. The apparatus of claim 6, wherein the generating of the dRU comprises generating two or more dRUs of a same size or different sizes, and wherein the performing of the wireless communication comprises performing a mixed-distribution bandwidth operation in different frequency sub-block or segments using the two or more dRUs with different distribution bandwidths.

* * * * *